United States Patent
Sato et al.

(10) Patent No.: US 12,449,105 B2
(45) Date of Patent: Oct. 21, 2025

(54) VEHICLE HEADLIGHT

(71) Applicant: KOITO MANUFACTURING CO., LTD., Tokyo (JP)

(72) Inventors: Ryuho Sato, Shizuoka (JP); Yuta Ugajin, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/695,198

(22) PCT Filed: Sep. 28, 2022

(86) PCT No.: PCT/JP2022/036289
§ 371 (c)(1),
(2) Date: Mar. 25, 2024

(87) PCT Pub. No.: WO2023/054525
PCT Pub. Date: Apr. 6, 2023

(65) Prior Publication Data
US 2024/0392938 A1 Nov. 28, 2024

(30) Foreign Application Priority Data

Oct. 1, 2021 (JP) .................................. 2021-163030
Oct. 1, 2021 (JP) .................................. 2021-163031

(51) Int. Cl.
*F21S 41/25* (2018.01)
*B60Q 1/14* (2006.01)
*F21S 41/43* (2018.01)

(52) U.S. Cl.
CPC ............ *F21S 41/25* (2018.01); *B60Q 1/1415* (2013.01); *F21S 41/43* (2018.01)

(58) Field of Classification Search
CPC .. F21S 41/25; F21S 41/43; F21S 41/29; F21S 45/47; F21S 41/24; F21S 41/255;
(Continued)

(56) References Cited

U.S. PATENT DOCUMENTS

2014/0016343 A1  1/2014  Brendle
2015/0323146 A1  11/2015  Krenn
(Continued)

FOREIGN PATENT DOCUMENTS

CN  106195665 A  12/2016
CN  110081389 A  8/2019
(Continued)

OTHER PUBLICATIONS

International Search Report issued Nov. 1, 2022 in International Application No. PCT/JP2022/036289.
(Continued)

*Primary Examiner* — Elmito Breval
(74) *Attorney, Agent, or Firm* — Sughrue Mion, PLLC

(57) ABSTRACT

A vehicle headlight (1) includes: a first light emitting optical system (LE1) that emits first light (L1); a second light emitting optical system (LE2) that emits second light (L2); a projection lens (35); and a beam shaper (50), in which the beam shaper (50) includes a main member (110) and a reinforcing member (120) overlapping the main member (110), the main member (110) includes a base portion (53) having a part that includes a front end of the main member (110) and does not overlap the reinforcing member (120) and a part that overlaps the reinforcing member (120) and to which the reinforcing member (120) is fixed, and an upper surface of the base portion (53) reflects a part of the first light (L1) toward the projection lens (35) in such a way as to form a cutoff line (CL) of a low beam light distribution pattern (PL).

21 Claims, 20 Drawing Sheets

(58) Field of Classification Search
CPC ........ F21S 41/47; F21S 41/143; F21S 41/295; B60Q 1/1415; F21W 2102/155; F21Y 2115/10
See application file for complete search history.

(56) References Cited

U.S. PATENT DOCUMENTS

2016/0039330 A1\* 2/2016 Rosenhahn .............. B60Q 1/06
362/512
2022/0299186 A1 9/2022 Inoue et al.

FOREIGN PATENT DOCUMENTS

| | | |
|---|---|---|
| CN | 209801356 U | 12/2019 |
| DE | 10 2011 013211 A1 | 9/2012 |
| EP | 2 799 761 A2 | 11/2014 |
| EP | 2 982 902 A1 | 2/2016 |
| JP | 2021-30791 A | 3/2021 |
| KR | 10-2018-0045564 A | 5/2018 |

OTHER PUBLICATIONS

Extended European Search Report issued Jul. 8, 2024 in European Application No. 22876391.8.

\* cited by examiner

VEHICLE HEADLIGHT

CROSS-REFERENCE TO RELATED APPLICATIONS

This is a National Stage of International Application No. PCT/JP2022/036289 filed Sep. 28, 2022, claiming priority based on Japanese Patent Application No. 2021-163030 filed Oct. 1, 2021, and Japanese Patent Application No. 2021-163031 filed Oct. 1, 2021.

TECHNICAL FIELD

The present invention relates to a vehicle headlight.

BACKGROUND ART

A vehicle headlight capable of switching light to be emitted between a low beam and a high beam is known, and Patent Literature 1 below discloses such a vehicle headlight.

The vehicle headlight disclosed in Patent Literature 1 below includes a first light emitting optical system, a second light emitting optical system disposed below the first light emitting optical system, a projection lens disposed in front of the first light emitting optical system and the second light emitting optical system, and a plate-shaped beam shaper disposed between the first and second light emitting optical systems and the projection lens. Each of the first light emitting optical system and the second light emitting optical system includes a light source and a lens that guides light from the light source toward the projection lens. First light emitted from the first light emitting optical system and second light emitted from the second light emitting optical system are transmitted through the projection lens. An upper surface of the beam shaper reflects a part of the first light toward the projection lens, so that a low beam light distribution pattern having a cutoff line is formed by the first light. In addition, a high beam light distribution pattern is formed by overlapping the first light and the second light. Therefore, it is possible to switch light to be emitted between the low beam and the high beam by switching between emission and non-emission of light of a second light source.

[Patent Literature 1] EP 2982902 A1

SUMMARY OF INVENTION

A vehicle headlight according to a first aspect of the present invention includes: a first light emitting optical system that emits first light forming a low beam light distribution pattern forward from a first part; a second light emitting optical system that emits second light forming a high beam light distribution pattern with the first light forward from a second part positioned below the first part; a projection lens that is disposed in front of the first part and the second part and transmits the first light and the second light; and a plate-shaped beam shaper that is disposed between the first and second parts and the projection lens, in which the beam shaper includes a plate-shaped main member and a plate-shaped reinforcing member overlapping the main member, the main member includes a base portion having a part that includes a front end of the main member and does not overlap the reinforcing member and a part that overlaps the reinforcing member and to which the reinforcing member is fixed, and an upper surface of the base portion reflects a part of the first light toward the projection lens in such a way as to form a cutoff line of the low beam light distribution pattern.

In the vehicle headlight according to the first aspect, the main member of the beam shaper includes the base portion having the part that includes the front end of the main member and does not overlap the reinforcing member and the part that overlaps the reinforcing member and to which the reinforcing member is fixed. Therefore, in the vehicle headlight according to the first aspect, the base portion of the main member can be suppressed from being easily deformed, and the front end of the base portion can maintain a predetermined shape even in a case where the main member is thinned, unlike a case where the beam shaper only includes the main member. Then, in the vehicle headlight according to the first aspect, the upper surface of the base portion reflects a part of the first light toward the projection lens in such a way as to form the cutoff line of the low beam light distribution pattern. Therefore, with the vehicle headlight according to the first aspect, the cutoff line of the low beam light distribution pattern can be formed into a predetermined shape while suppressing formation of a linear dark region extending in the left-right direction in the high beam light distribution pattern unlike the above case. Therefore, with the vehicle headlight according to the first aspect, the low beam light distribution pattern and the high beam light distribution pattern can be more appropriately formed as compared with the above case.

The vehicle headlight according to the first aspect may further include a holder that holds the beam shaper, in which the main member may further include a pair of fixing portions that pinch the base portion in a left-right direction and are connected to a left end and a right end of the base portion, respectively, the reinforcing member may include a pair of left and right attachment portions that overlap only the pair of fixing portions and are fixed to the fixing portions, respectively, and a connecting portion that extends from one attachment portion to the other attachment portion, at least partially overlaps the base portion, and is fixed to the base portion, and the fixing portions and the attachment portions may be fixed to the holder.

Such a configuration can prevent the first light from being blocked by the holder. In addition, in the vehicle headlight according to the first aspect, both the left and right sides of the beam shaper are held by the holder. Therefore, in the vehicle headlight according to the first aspect, the front end of the base of the main member can maintain a predetermined shape even in a case where the main member is thinned, unlike a case where only one of the left and right sides of the beam shaper is held by the holder.

In the vehicle headlight according to the first aspect, the reinforcing member may be positioned under the main member.

With such a configuration, it is possible to suppress formation of an unintended bright region or dark region in the low beam light distribution pattern due to reflection of the first light on a side surface of the reinforcing member.

Alternatively, in the vehicle headlight according to the first aspect, the reinforcing member may be positioned on the main member.

In the vehicle headlight according to the first aspect, a Young's modulus of the reinforcing member may be higher than a Young's modulus of the main member.

With such a configuration, it becomes easier to make the base portion less likely to be deformed without increasing the thickness of the main member as compared with a case where the Young's modulus of the reinforcing member is equal to or lower than the Young's modulus of the main member.

In the vehicle headlight according to the first aspect, the reinforcing member may have a thickness larger than a thickness of the main member.

With such a configuration, it becomes easy to make the base portion less likely to be deformed even in a case where the Young's modulus of the reinforcing member and the Young's modulus of the main member are the same.

In the vehicle headlight according to the first aspect, the first light emitting optical system and the second light emitting optical system may share a light guide member having a first emission region as the first part and a second emission region as the second part on a front side surface of the light guide member, at least one of the main member or the reinforcing member may include a position regulating portion extending rearward from a rear end of the main member or the reinforcing member, and the light guide member may include a recessed portion into which the position regulating portion is inserted in the front side surface.

In the vehicle headlight according to the first aspect, the position regulating portion is inserted into the recessed portion, and thus, it is possible to suppress misalignment in a relative position between the beam shaper and the light guide member. Therefore, with the vehicle headlight, the low beam light distribution pattern and the high beam light distribution pattern can be more appropriately formed as compared with a case where the beam shaper does not include the position regulating portion.

In the vehicle headlight according to the first aspect, the base portion may include a first base portion extending in a horizontal direction, an inclined portion extending obliquely downward from an edge of the first base portion on one side of the first base portion in a left-right direction toward a side opposite to the first base portion, and a second base portion extending in the horizontal direction from an edge of the inclined portion on the side opposite to the first base portion toward a side opposite to the inclined portion.

In the vehicle headlight according to the first aspect, the cutoff lines of the low beam light distribution pattern may include a first line extending in the horizontal direction from an elbow point to one side in the left-right direction, an inclined line extending obliquely upward from the elbow point to the other side in the left-right direction, and a second line extending in the horizontal direction from an end of the inclined line opposite to the elbow point.

A vehicle headlight according to a second aspect of the present invention includes: a first light source that emits first light forming a low beam light distribution pattern forward; a second light source that is disposed below the first light source and emits second light forming a high beam light distribution pattern with the first light forward; a projection lens that is disposed in front of the first light source and the second light source; a light guide member that is disposed between the first and second light sources and the projection lens, receives the first light and the second light, emits the first light from a first part toward the projection lens, and emits the second light from a second part positioned below the first part toward the projection lens; a beam shaper that is disposed between the first and second parts and the projection lens and includes a plate-shaped main body and a position regulating portion; and a holder that holds the beam shaper and the light guide member, in which an upper surface of the main body portion reflects a part of the first light toward the projection lens in such a way as to form a cutoff line of the low beam light distribution pattern, the position regulating portion extends rearward from the main body portion, and the light guide member includes a recessed portion into which the position regulating portion is inserted on a front side surface of the light guide member.

In the vehicle headlight according to the second aspect, as described above, the position regulating portion of the beam shaper is inserted into the recessed portion of the light guide member. Therefore, in the vehicle headlight, it is possible to suppress misalignment in the relative position between the beam shaper and the light guide member as compared with a case where the beam shaper does not include the position regulating portion. Therefore, with the vehicle headlight, the low beam light distribution pattern and the high beam light distribution pattern can be more appropriately formed as compared with the above case.

In addition, in the vehicle headlight according to the second aspect, the main body portion may include a pair of left and right fixing portions fixed to the holder, and a base portion positioned between the pair of fixing portions and having left and right ends connected to the fixing portions, and the position regulating portion may be a plate-shaped member extending from a rear end of one fixing portion to a rear end of the other fixing portion through a rear side of the base portion.

In the vehicle headlight according to the second aspect, a gap is formed between the base portion and the position regulating portion. Therefore, with such a configuration, moldability of the beam shaper in press working in a case where the base portion has bent portions can be improved as compared with a case where a gap is not formed between the base portion and the position regulating portion.

Alternatively, in the vehicle headlight according to the second aspect, the main body portion may include a pair of left and right fixing portions fixed to the holder, and a base portion positioned between the pair of fixing portions and having left and right ends connected to the fixing portions, and the position regulating portion may be a plate-shaped member extending rearward from a section of a rear end of the main body portion, the second continuing from one fixing portion to the other fixing portion.

With such a configuration, the rigidity of the beam shaper can be improved as compared with a case where a gap is formed between the base portion and the position regulating portion.

In a case where the main body portion of the vehicle headlight according to the second aspect includes the pair of fixing portions and the base portion, the beam shaper may include a protrusion protruding upward or downward, and the protrusion may extend from one fixing portion to the other fixing portion through the position regulating portion.

With such a configuration, the rigidity of the beam shaper can be increased as compared with a case where the beam shaper does not have the protrusion. In the vehicle headlight according to the second aspect, no protrusion is formed on the base portion. Therefore, in the vehicle headlight according to the second aspect, it is possible to suppress blocking of the first light and the second light by the protrusion, and to more appropriately form the low beam light distribution pattern and the high beam light distribution pattern as compared with a case where the protrusion is formed on the base portion.

In this case, in each of the pair of fixing portions, a part of the fixing portion fixed to the holder and the protrusion may overlap each other in a left-right direction.

With such a configuration, the rigidity of the beam shaper held by the holder can be further increased as compared with a case where the part and the protrusion do not overlap each other in the left-right direction.

In addition, in the vehicle headlight according to the second aspect, the main body portion may include a pair of left and right fixing portions fixed to the holder, and a base portion positioned between the pair of fixing portions and having left and right ends connected to the fixing portions, and the position regulating portion may be a plate-shaped member extending rearward from a part of a rear end of the base portion.

With such a configuration, the recessed portion can be made smaller as compared with a case where the position regulating portion is a plate-shaped member extending rearward from an entire rear end of the base portion. For example, in a case where the recessed portion is formed in an emission surface of the light guide member from which light is emitted, a range in which light can be emitted in a desired direction is narrowed, as a result of which energy efficiency is lowered. Therefore, the vehicle headlight according to the second aspect is useful in a case where the recessed portion is formed in the emission surface of the light guide member from which light is emitted.

In the vehicle headlight according to the second aspect, in a case where the main body portion includes the pair of fixing portions and the base portion, and the position regulating portion is a plate-shaped member, a rear end portion of the position regulating portion and the pair of fixing portions may be positioned on the same plane.

With such a configuration, it is possible to easily align the beam shaper and the light guide member as compared with a case where the rear end portion of the position regulating portion is inclined with respect to the fixing portions.

In a case where the position regulating portion of the vehicle headlight according to the second aspect is a plate-shaped member, the recessed portion may be a groove extending along a rear end of the position regulating portion, and the entire rear end of the position regulating portion may be inserted into the recessed portion.

With such a configuration, the maximum amount of change in relative position between the beam shaper and the light guide member can be reduced as compared with a case where only a part of the rear end of the position regulating portion is inserted into the recessed portion.

In a case where the position regulating portion of the vehicle headlight according to the second aspect is a plate-shaped member, the recessed portion may be a groove extending along the rear end of the position regulating portion, the recessed portion may have a pair of surfaces extending in a depth direction of the recessed portion and facing each other, and the pair of surfaces may be inclined in such a way as to approach each other toward a bottom of the recessed portion.

With such a configuration, it is possible to more easily insert the position regulating portion into the recessed portion while suppressing an increase in maximum amount of change in relative position between the beam shaper and the light guide member as compared with a case where the recessed portion does not have the pair of surfaces.

In the vehicle headlight according to the second aspect, the main body portion may include a pair of left and right fixing portions fixed to the holder, and a base portion positioned between the pair of fixing portions and having left and right ends connected to the fixing portions, and the position regulating portion may be a pin extending rearward from the base portion.

In the vehicle headlight according to the second aspect, the base portion may include a first base portion extending in a horizontal direction, an inclined portion extending obliquely downward from an edge of the first base portion on one side of the first base portion in a left-right direction toward a side opposite to the first base portion, and a second base portion extending in the horizontal direction from an edge of the inclined portion on the side opposite to the first base portion toward a side opposite to the inclined portion.

In the vehicle headlight according to the second aspect, the cutoff lines of the low beam light distribution pattern may include a first line extending in the horizontal direction from an elbow point to one side in the left-right direction, an inclined line extending obliquely upward from the elbow point to the other side in the left-right direction, and a second line extending in the horizontal direction from an end of the inclined line opposite to the elbow point.

In the vehicle headlight according to the second aspect, the main body portion may include a plate-shaped main member and a plate-shaped reinforcing member overlapping each other, the main member may include a base portion having a part that includes a front end of the main member and does not overlap the reinforcing member and a part that overlaps the reinforcing member and to which the reinforcing member is fixed, and an upper surface of the base portion may reflect a part of the first light toward the projection lens in such a way as to form the cutoff line of the low beam light distribution pattern.

A linear dark region extending in the left-right direction may be formed in the high beam light distribution pattern in a case where a front end of the beam shaper is thick. In the vehicle headlight according to the second aspect, the base portion of the main member can be suppressed from being easily deformed, and the front end of the base portion can maintain a predetermined shape even in a case where the main member is thinned, unlike a case where the beam shaper only includes the main member. Then, in the vehicle headlight according to the second aspect, the upper surface of the base portion reflects a part of the first light toward the projection lens in such a way as to form the cutoff line of the low beam light distribution pattern. Therefore, with the vehicle headlight according to the second aspect, the cutoff line of the low beam can be formed into a predetermined shape while suppressing formation of a linear dark region extending in the left-right direction in the high beam light distribution pattern unlike the above case.

In the vehicle headlight according to the second aspect, the holder may hold the beam shaper and the light guide member.

With such a configuration, it is possible to suppress misalignment in a relative position between the beam shaper and the light guide member.

DESCRIPTION OF EMBODIMENTS

Figure 1:
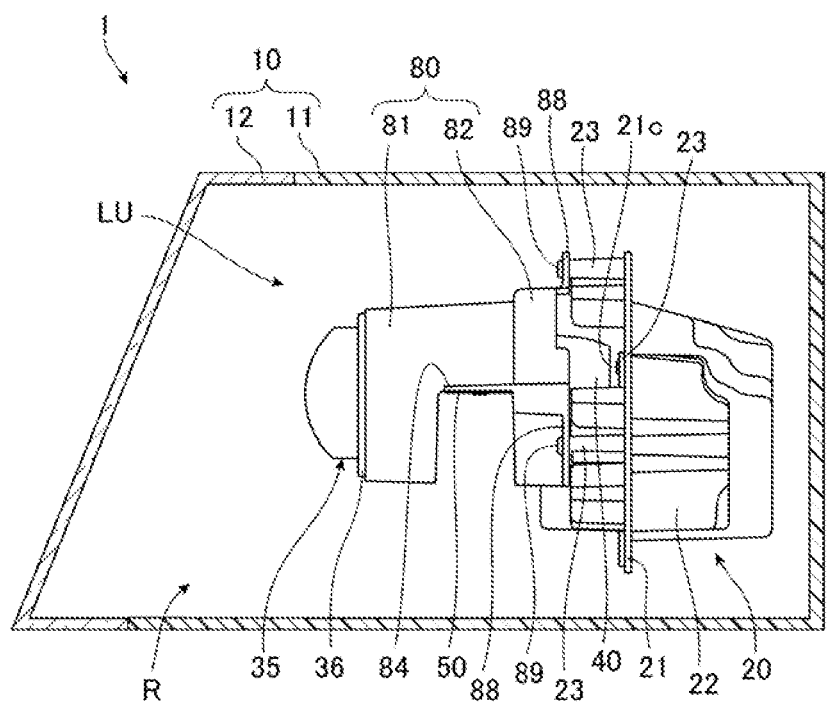
FIG. 1 is a side view schematically illustrating a vehicle headlight according to a first embodiment as a first aspect of the present invention.

Hereinafter, modes for implementing a vehicle headlight according to the present invention will be exemplified with reference to the accompanying drawings. Embodiments exemplified below are intended to facilitate understanding of the present invention and are not intended to limit the present invention. The present invention can be changed and modified without departing from the gist of the present invention. In the present invention, constituent elements in the following embodiments may be appropriately combined. In the drawings referred to below, dimensions of each member may be changed for easy understanding.

First Embodiment

A first embodiment as a first aspect of the present invention will be described. FIG. 1 is a side view schematically illustrating a vehicle headlight in the present embodiment. The vehicle headlight is generally provided at each of left and right portions on a front side of a vehicle. In the present specification, "right" refers to a right side in a forward movement direction of the vehicle, and "left" refers to a left side in the forward movement direction of the vehicle. Each of the left and right vehicle headlights has the same configuration except that shapes thereof are substantially symmetrical to each other in a left-right direction. Therefore, one vehicle headlight will be described below.

A vehicle headlight 1 according to the present embodiment includes a housing 10 and a lamp unit LU as main components. In FIG. 1, a vertical cross section of the housing 10 is illustrated. The housing 10 includes a lamp housing 11 and a light transmissive front cover 12. A front side of the lamp housing 11 is opened, and the front cover 12 is fixed to the lamp housing 11 in such a way as to close the opening. A space formed by the lamp housing 11 and the front cover 12 is a lamp room R, and the lamp unit LU is housed in the lamp room R.

Figure 2:
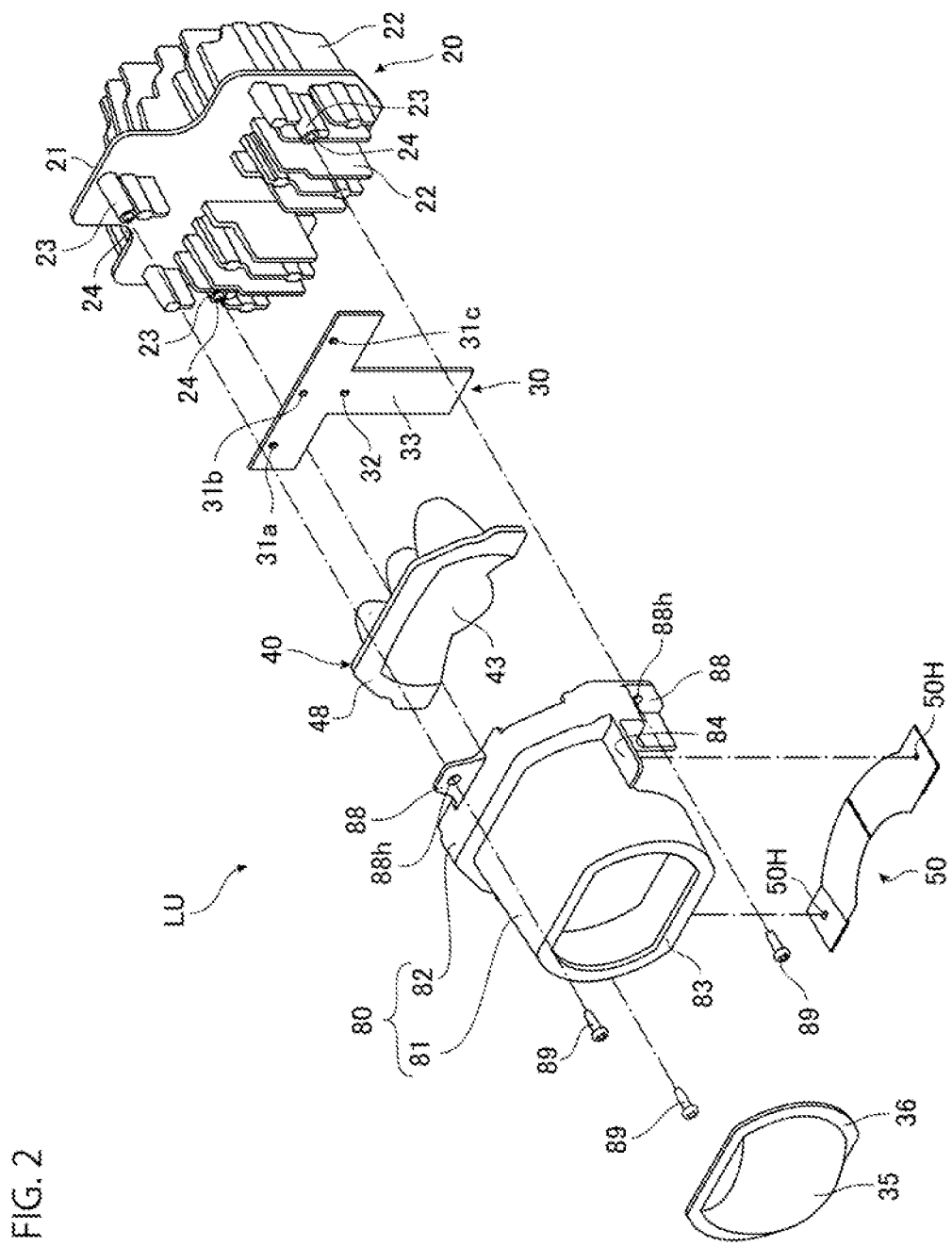
FIG. 2 is an exploded perspective view schematically illustrating a lamp unit.
Figure 3:
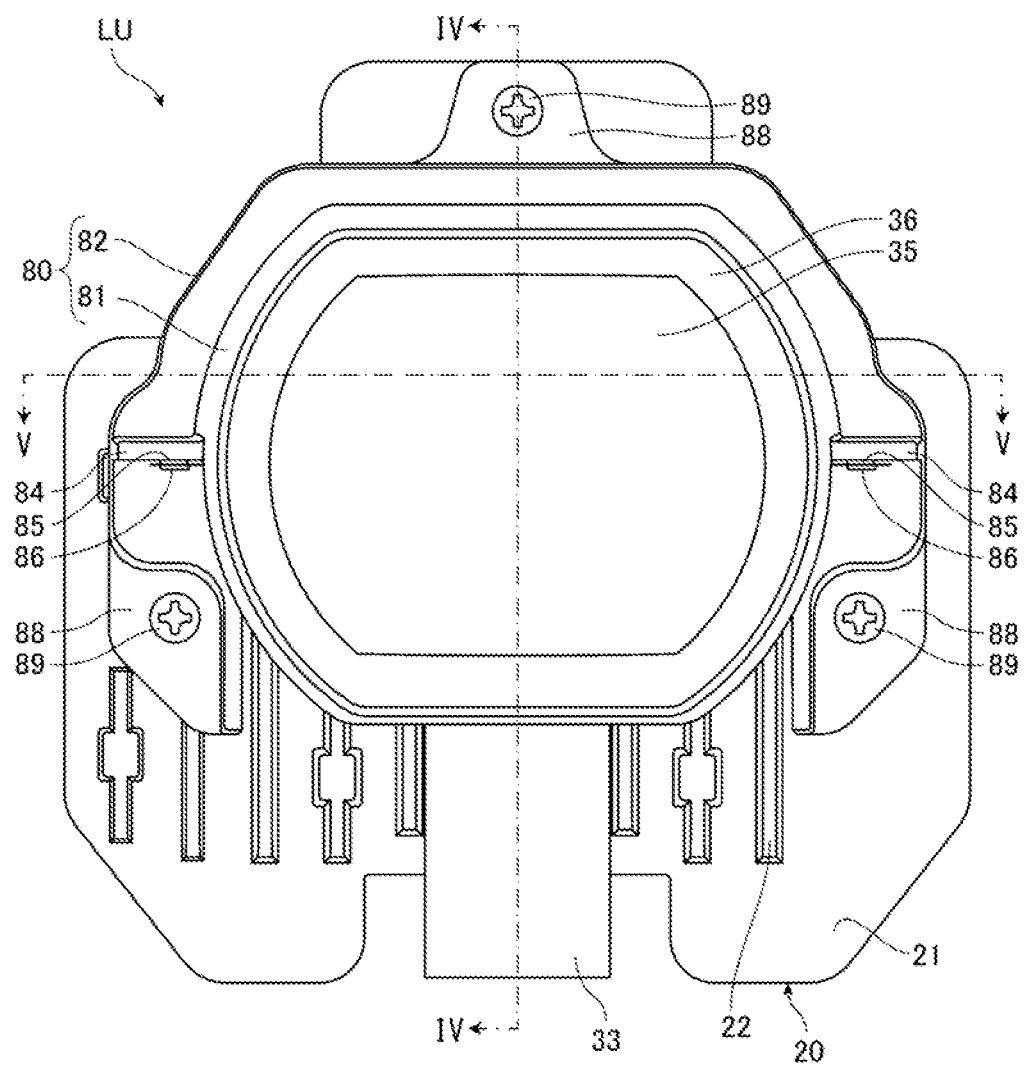
FIG. 3 is a front view schematically illustrating the lamp unit.
Figure 4:
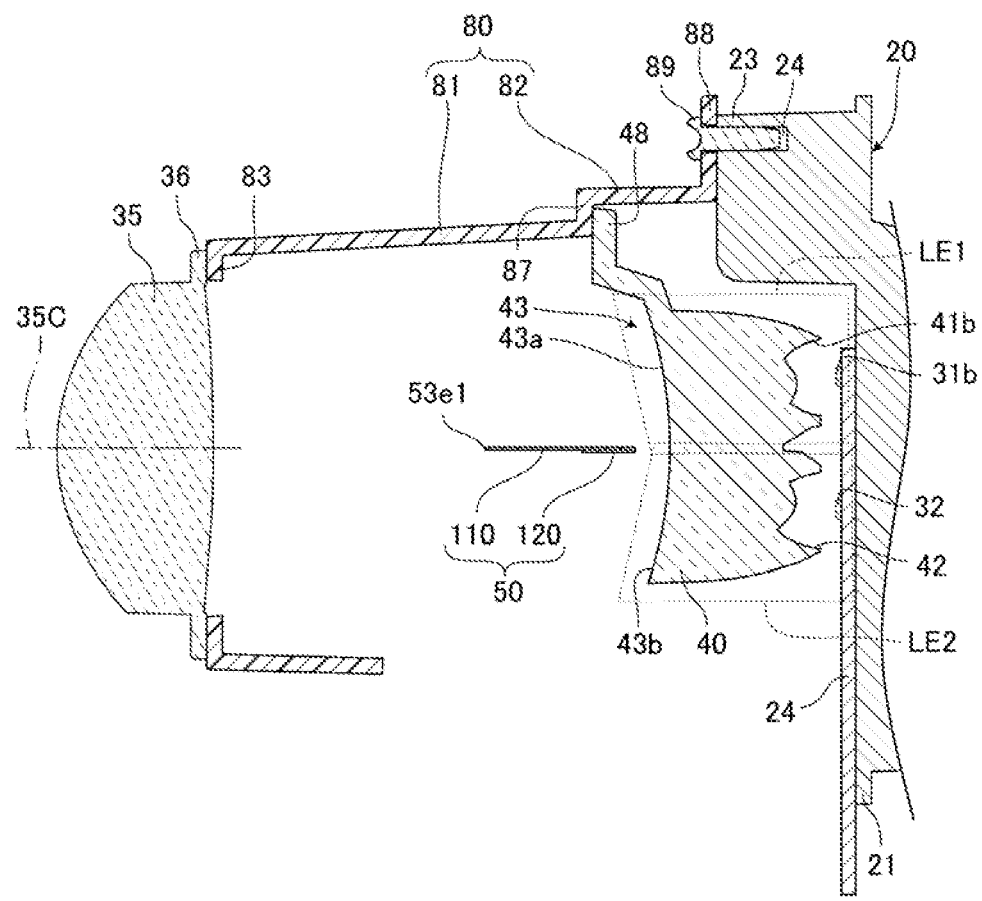
FIG. 4 is a view schematically illustrating a cross section of the lamp unit taken along line IV-IV in FIG. 3.

FIG. 2 is an exploded perspective view schematically illustrating the lamp unit LU, and is an exploded perspective view of the lamp unit LU as viewed from the front and obliquely above. FIG. 3 is a front view schematically illustrating the lamp unit LU, and is a front view of the lamp unit LU as viewed from the front. FIG. 4 is a view schematically illustrating a cross section of the lamp unit LU taken along line IV-IV in FIG. 3. As illustrated in FIGS. 1 to 4, the lamp unit LU according to the present embodiment mainly includes a heat sink 20, a light source unit 30, a projection lens 35, a light guide member 40, a beam shaper 50, and a holder 80.

The heat sink 20 according to the present embodiment includes a metal base plate 21 extending substantially vertically and horizontally, and a plurality of heat dissipation fins 22 are provided integrally with the base plate 21 on a rear surface side and a front surface side of the base plate 21. Three bosses 23 protruding forward are provided integrally with the base plate 21 on the front surface side of the base plate 21. Each boss 23 has a screw hole 24 formed from a distal end surface along the boss 23.

The light source unit 30 according to the present embodiment includes three first light sources 31*a*, 31*b*, and 31*c*, a second light source 32, and a circuit board 33. The circuit board 33 is placed on a front surface of the base plate 21 in the heat sink 20 and is fixed to the base plate 21 by screws (not illustrated). The first light sources 31*a*, 31*b*, and 31*c* and the second light source 32 are mounted on the circuit board 33, and emit white light forward when power is supplied from the circuit board 33. In the present embodiment, the first light sources 31*a*, 31*b*, and 31*c* and the second light source 32 are light emitting diodes (LEDs). The first light source 31*a* is disposed on a right side of the first light source 31*b* at an interval, the first light source 31*c* is disposed on a left side of the first light source 31*b* at an interval, and the first light sources 31*a*, 31*b*, and 31*c* are aligned in the left-right direction. The first light sources 31*a*, 31*b*, and 31*c* are light sources for a low beam, and emit first light forming a low beam light distribution pattern forward. The second light source 32 is disposed below the first light sources 31*a*, 31*b*, and 31*c*, and the second light source 32 and the first light source 31*b* are aligned in a substantially vertical direction. The second light source 32 is a light source for a high beam, and emits second light forming a high beam light distribution pattern with the first light forward. The types and numbers of first light sources 31*a*, 31*b*, and 31*c* and second light sources 32 are not particularly limited.

The projection lens 35 is a lens that changes a divergence angle of transmitted light, and is disposed in front of the first light sources 31a, 31b, and 31c and the second light source 32. In the present embodiment, the projection lens 35 is a biconvex aspheric lens having a substantially oval track shape whose outer shape is long in the left-right direction, and an optical axis 35C of the projection lens 35 extends in a front-rear direction and passes between the first light source 31b and the second light source 32. FIG. 4 is a vertical cross-sectional view of the lamp unit LU along the optical axis 35C. A flange portion 36 protruding outward and extending over the entire periphery of the projection lens 35 is provided on an outer peripheral surface of the projection lens 35. Examples of a material of the projection lens 35 include a resin and glass.

Figure 5:
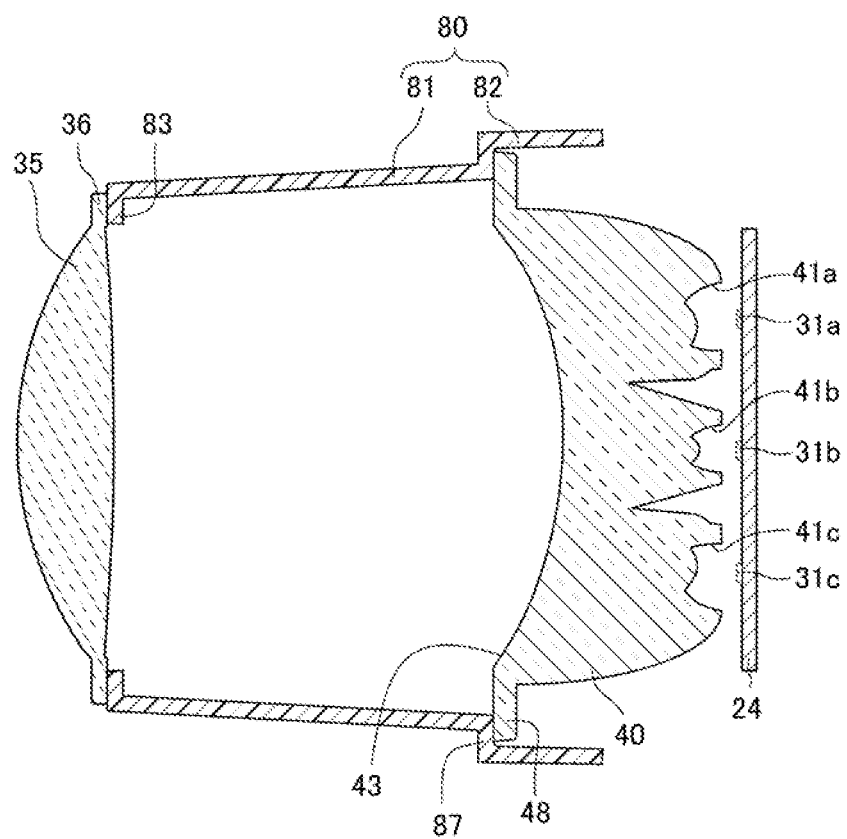
FIG. 5 is a view schematically illustrating a cross section of the lamp unit taken along line V-V in FIG. 3.

FIG. 5 is a view schematically illustrating a cross section of the lamp unit LU taken along line V-V in FIG. 3, and is a horizontal cross-sectional view of the lamp unit LU, passing through the first light sources 31a, 31b, and 31c. The heat sink 20 is not illustrated in FIG. 5. As illustrated in FIGS. 2, 4, and 5, the light guide member 40 is disposed between the projection lens 35 and the first light sources 31a, 31b, and 31c and the second light source 32, and guides the first light emitted from the first light sources 31a, 31b, and 31c and the second light emitted from the second light source 32 to enter the projection lens 35.

The light guide member 40 according to the present embodiment has three first incident surfaces 41a, 41b, and 41c and a second incident surface 42 on a rear side of the light guide member 40, and has an emission surface 43 on a front side of the light guide member 40. The first light from the first light source 31a is incident on the first incident surface 41a, the first light from the first light source 31b is incident on the first incident surface 41b, the first light from the first light source 31c is incident on the first incident surface 41c, and the second light from the second light source 32 is incident on the second incident surface 42. In addition, a plate-shaped flange portion 48 protruding outward and extending along an outer edge at a front end of the light guide member 40 is provided at an upper portion and both of left and right side portions at a front end portion of the light guide member 40.

The light guide member 40 directly or totally reflects the first light incident from the first incident surfaces 41a, 41b, and 41c and guides the first light to the emission surface 43, and directly or totally reflects the second light incident from the second incident surface 42 and guides the second light to the emission surface 43. The emission surface 43 emits the first light and the second light guided in this manner toward the projection lens 35. In the present embodiment, the emission surface 43 is concavely curved rearward. As illustrated in FIG. 4, the beam shaper 50 described below is disposed between the emission surface 43 and the projection lens 35. A region of the emission surface 43 above a rear end of the beam shaper 50 is a first emission region 43a from which the first light is emitted. A region of the emission surface 43 below the rear end of the beam shaper 50 is a second emission region 43b from which the second light is emitted. The light guide member 40 guides the first light and the second light in this manner. Therefore, a first light emitting optical system LE1 that emits the first light forward is formed by the first light sources 31a, 31b, and 31c and the light guide member 40. In addition, a second light emitting optical system LE2 that emits the second light forward is formed by the second light source 32 and the light guide member 40, and the first light emitting optical system LE1 and the second light emitting optical system LE2 share the light guide member 40. A first part of the first light emitting optical system LE1 that emits the first light is the first emission region 43a of the emission surface 43. A second part of the second light emitting optical system LE2 that emits the second light is the second emission region 43b of the emission surface 43, and the second emission region 43b is positioned below the first emission region 43a that is the first part.

Figure 6:
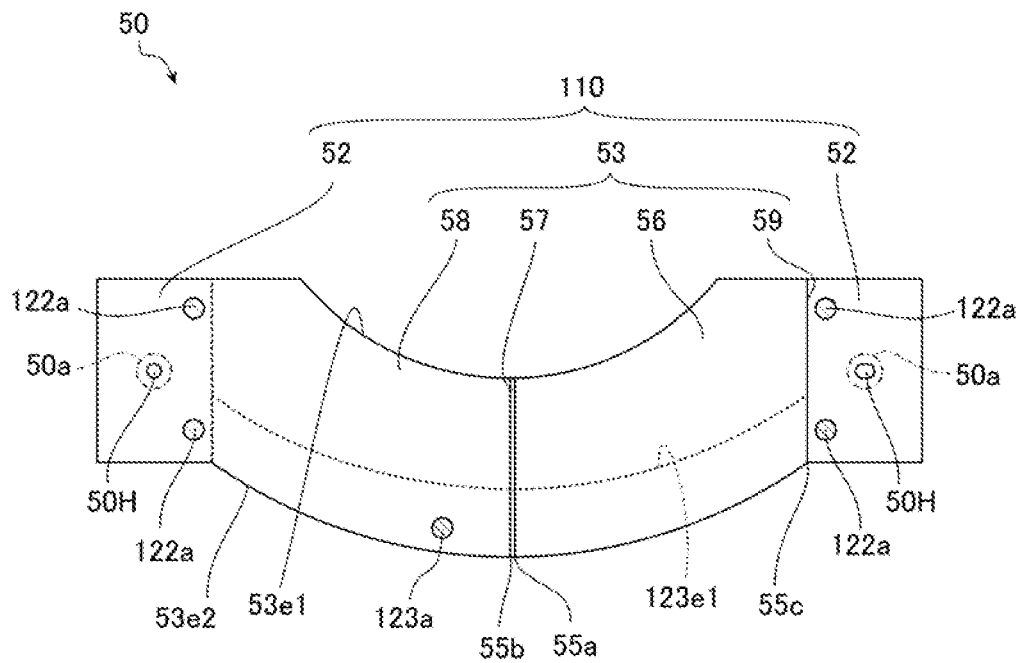
FIG. 6 is a plan view schematically illustrating a beam shaper.
Figure 7:
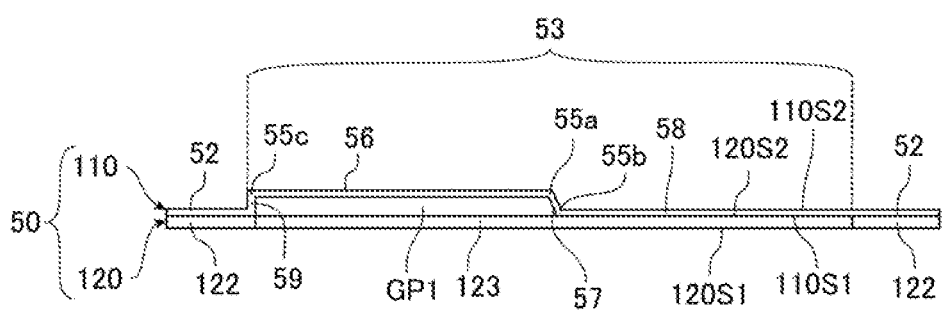
FIG. 7 is a front view schematically illustrating the beam shaper.
Figure 8:
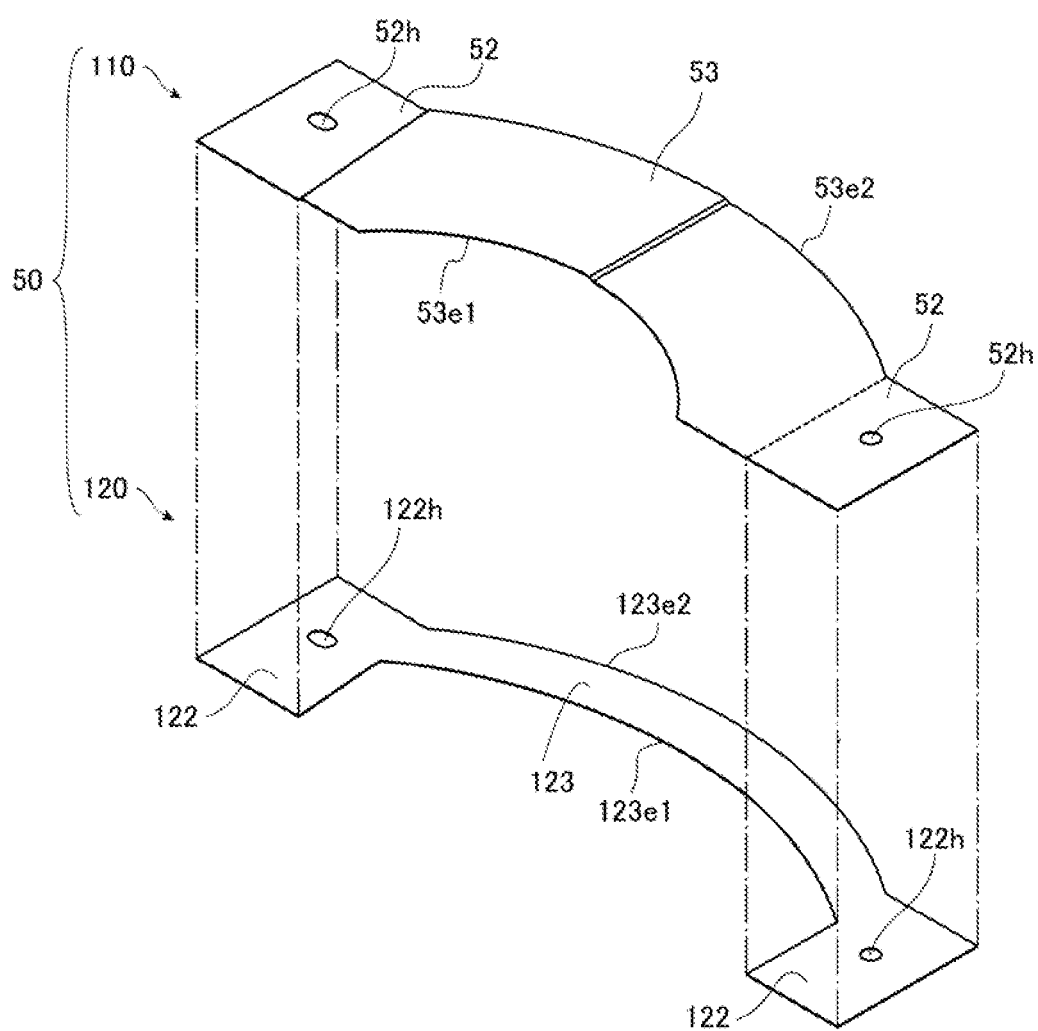
FIG. 8 is an exploded perspective view schematically illustrating the beam shaper.

FIG. 6 is a plan view schematically illustrating the beam shaper 50, and is a plan view of the beam shaper 50 as viewed from above. The upper side in FIG. 6 is a front side of the vehicle, and the lower side in FIG. 6 is a rear side of the vehicle. FIG. 7 is a front view schematically illustrating the beam shaper 50, and is a front view of the beam shaper 50 as viewed from the front. FIG. 8 is an exploded perspective view schematically illustrating the beam shaper 50, and is an exploded perspective view of the beam shaper 50 as viewed from the front and obliquely above. As illustrated in FIGS. 6 to 8, the plate-shaped beam shaper 50 includes a plate-shaped main member 110 and a plate-shaped reinforcing member 120 that overlap each other.

The main member 110 according to the present embodiment is a plate-shaped member which is long in the left-right direction and of which one main surface faces upward. The main member 110 includes a pair of left and right fixing portions 52 and 52 and a base portion 53. In FIGS. 6 and 8, a dotted line indicating a boundary between the left fixing portion 52 and the base portion 53 is illustrated. The pair of fixing portions 52 and 52 extend in a horizontal direction and each have a through-hole 52h penetrating in a thickness direction. The pair of fixing portions 52 and 52 are positioned on the same plane.

The base portion 53 is long in the left-right direction, is positioned between the pair of fixing portions 52 and 52 and pinched by the pair of fixing portions 52 and 52 in the left-right direction, and has a left end connected to the left fixing portion 52 and a right end connected to the right fixing portion 52. A central portion of a front end 53e1 of the base portion 53 in the left-right direction is curved in an arc shape recessed rearward, and both end portions of the front end 53e1 in the left-right direction are positioned on the same straight line extending in the left-right direction. A rear end 53e2 of the base portion 53 is curved in an arc shape protruding rearward.

The base portion 53 has three bent portions 55a, 55b, and 55c at which the base portion 53 is bent. The bent portions 55a, 55b, and 55c extend substantially linearly from the front end 53e1 to the rear end 53e2. The bent portion 55a forms a first base portion 56 extending in the horizontal direction and an inclined portion 57 extending obliquely downward from a left edge which is one side of the first base portion 56 in the left-right direction toward a side opposite to the first base portion 56. The bent portion 55b forms a second base portion 58 extending in the horizontal direction from an edge of the inclined portion 57 on a side opposite to the first base portion 56 toward a side opposite to the inclined portion 57. A left edge of the second base portion 58 is connected to the left fixing portion 52, and the second base portion 58 and the left fixing portion 52 are positioned on the same plane. The bent portion 55c forms a connecting portion 59 extending downward from an edge of the first base portion 56 on a side opposite to the inclined portion 57. An edge of the connecting portion 59 on a side opposite to the first base portion 56 is connected to the right fixing portion 52.

The reinforcing member 120 is a plate-shaped member of which one main surface faces upward. The reinforcing member 120 includes a pair of left and right attachment portions 122 and a connecting portion 123. In the present embodiment, the reinforcing member 120 is positioned under the main member 110, and an upper surface 120S2 of the reinforcing member 120 and a lower surface 110S1 of the main member 110 face each other. The reinforcing member 120 is overlapped on the lower surface 110S1 of the main member 110. The right attachment portion 122 overlaps only the right fixing portion 52, and the left attachment portion 122 overlaps only the left fixing portion 52. The fixing portion 52 and the attachment portion 122 overlapping each other have the same shape, and the entire fixing portion 52 and the entire attachment portion 122 overlap each other. Each of the attachment portions 122 has a through-hole 122h overlapping the through-hole 52h of the fixing portion 52. Therefore, a through-hole 50H including the through-hole 52h and the through-hole 122h is formed on each of left and right sides of the beam shaper 50. Each of the attachment portions 122 is fixed to the fixing portion 52 by, for example, laser welding. In FIG. 6, a fixed part 122a is indicated by hatching including oblique lines. The position of the fixed part 122a is not particularly limited. The fixing portion 52 and the attachment portion 122 may have different shapes.

The connecting portion 123 extends from one attachment portion 122 to the other attachment portion 122, and at least partially overlaps the base portion 53. The connecting portion 123 is fixed to the base portion 53 by, for example, laser welding, and a fixed part 123a is indicated by hatching including oblique lines in FIG. 6. In the present embodiment, the connecting portion 123 is fixed to the second base portion 58 of the base portion 53. The connecting portion 123 and the pair of attachment portions 122 are positioned on the same plane, and a gap GP1 is formed between the first base portion 56 and the inclined portion 57 of the base portion 53 and the connecting portion 123. When viewed in the thickness direction of the reinforcing member 120, the front end 53e1 of the base portion 53 is positioned in front of the connecting portion 123. Therefore, the base portion 53 has a part that includes a front end of the main member 110 and does not overlap the reinforcing member 120, and a part that overlaps the reinforcing member 120 and to which the reinforcing member 120 is fixed. In the present embodiment, a front end 123e1 of the connecting portion 123 of the reinforcing member 120 is curved in an arc shape recessed rearward, and a distance between the front end 123e1 and the front end 53e1 is maintained at a predetermined value or more in the left-right direction. The rear end 123e2 of the connecting portion 123 is aligned with the rear end 53e2 of the base portion 53. The rear end 123e2 and the rear end 53e2 do not have to be aligned with each other.

Examples of a member forming the main member 110 and the plate-shaped reinforcing member 120 include a metal plate and a plated metal plate, and examples of the metal include stainless steel and carbon steel. In the present embodiment, the reinforcing member 120 has a thickness larger than that of the main member 110, but the thickness of the reinforcing member 120 may be equal to or smaller than the thickness of the main member 110. The thicknesses of the main member 110 and the reinforcing member 120 are, for example, 0.05 mm to 1.0 mm. In the present embodiment, a Young's modulus of the reinforcing member 120 is higher than a Young's modulus of the main member 110, but the Young's modulus of the reinforcing member 120 may be equal to or lower than the Young's modulus of the main member 110.

As illustrated in FIG. 4, the beam shaper 50 is disposed between the projection lens 35 and the first and second emission regions 43a and 43b of the emission surface 43, the first emission region 43a being a part of the light guide member 40 from which the first light is emitted, and the second emission region 43b being a part of the light guide member 40 from which the second light is emitted. In the present embodiment, the beam shaper 50 crosses the emission surface 43 when viewed from the front along the optical axis 35C of the projection lens 35. In addition, the optical axis 35C passes through the bent portion 55a of the base portion 53 of the main member 110 or the vicinity thereof, and a rear focal point of the projection lens 35 is positioned at the front end 53e1 of the base portion 53 or the vicinity thereof.

As illustrated in FIGS. 2, 4, and 5, the holder 80 according to the present embodiment includes a support portion 81 and a protective portion 82, and supports the projection lens 35, the light guide member 40, and the beam shaper 50. Examples of a material of the holder 80 include a resin such as opaque polycarbonate, and in the present embodiment, the support portion 81 and the protective portion 82 are integrally formed.

The support portion 81 is a cylindrical member extending in the front-rear direction, and a flange portion 83 protruding from an inner peripheral surface of the support portion 81 is provided at a front end portion of the support portion 81. The flange portion 36 of the projection lens 35 is in contact with the flange portion 83 from the front, and the flange portion 36 is fixed to the flange portion 83 by, for example, ultrasonic fusion splicing or laser welding. A predetermined range of a lower side of the support portion 81 extending forward from a rear end of the support portion 81 is notched, and a support plate 84 extending substantially horizontally outward is provided at a lower end portion on a right side and a lower end portion on a left side in the predetermined range. Further, a connecting wall 87 protruding from an outer surface of the support portion 81 in a direction substantially perpendicular to an extending direction of the support portion 81 is provided at the rear end of the support portion 81. As illustrated in FIG. 3, a pedestal portion 85 protruding downward is provided on a lower surface of the support plate 84. Each of the pair of left and right fixing portions 52 in the main member 110 of the beam shaper 50 is in contact with a distal end of the pedestal portion 85 from below, and is fixed to the pedestal portion 85 together with the attachment portion 122 of the reinforcing member 120 overlapping the fixing portion 52. In the present embodiment, the fixing portion 52 and the attachment portion 122 are fixed to the pedestal portion 85 by thermal caulking. Specifically, a head portion 86 that closes an opening of the through-hole 50H on a side opposite to the pedestal portion 85 is formed by melting a distal end portion of a pin protruding downward from the pedestal portion 85 and penetrating through the through-hole 50H by heat. In this way, the fixing portion 52 and the attachment portion 122 are sandwiched by the pedestal portion 85 and the head portion 86, and the fixing portion 52 and the attachment portion 122 are fixed to the pedestal portion 85. In FIG. 6, a part 50a fixed to the pedestal portion 85 by thermal caulking is indicated by a line with alternating long and short dashes. At the part 50a, the attachment portion 122 is fixed to the fixing portion 52, and the fixing portion 52 and the attachment portion 122 are fixed to the pedestal portion 85. A method of fixing the beam shaper 50 is not particularly limited, and the beam shaper 50 may be fixed by laser welding, for example.

As illustrated in FIGS. 2, 4, and 5, the protective portion 82 is a plate-shaped member that is positioned behind the support portion 81 and surrounds both left and right sides and an upper side of the light guide member 40. In the present embodiment, the protective portion 82 surrounds both left and right sides and an upper side of a front side portion of the light guide member 40. A front end of the protective portion 82 is connected to the connecting wall 87, the flange portion 48 of the light guide member 40 is in contact with the connecting wall 87 from behind, and the flange portion 48 is fixed to the connecting wall 87 by, for example, ultrasonic fusion splicing or laser welding. In this way, the projection lens 35, the light guide member 40, and the beam shaper 50 are supported by the holder 80.

As illustrated in FIGS. 2 to 4, three fixing plates 88 protruding substantially vertically from an outer surface of a rear end portion of the protective portion 82 are provided at the rear end portion of the protective portion 82. The fixing plate 88 corresponds to the boss 23 of the heat sink 20, and the fixing plate 88 has a through-hole 88h. The fixing plate 88 is in contact with a distal end of the boss 23 from the front, and a screw 89 is inserted into the through-hole 88h and fastened to a screw hole 24, whereby the holder 80 is fixed to the heat sink 20. In this way, the projection lens 35, the light guide member 40, and the beam shaper 50 are fixed to the heat sink 20 via the holder 80.

Figure 9:
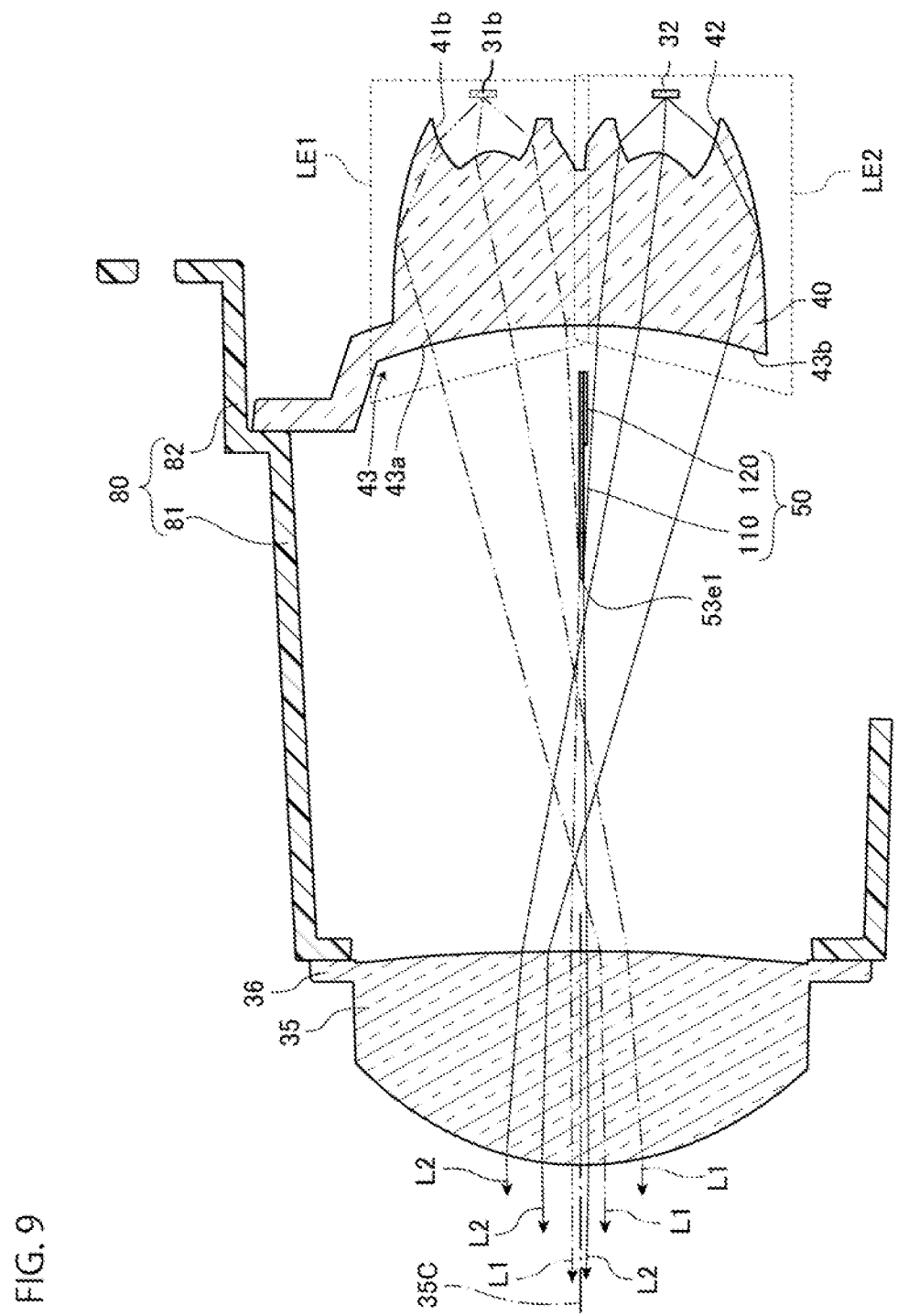
FIG. 9 is an enlarged view of a part of FIG. 4, schematically illustrating an optical path example of first light emitted from a first light source and second light emitted from a second light source.

Next, formation of the low beam light distribution pattern by the vehicle headlight 1 will be described. FIG. 9 is an enlarged view of a part of FIG. 4, schematically illustrating an optical path example of the first light emitted from the first light source and the second light emitted from the second light source. A reflection angle, a refraction angle, and the like of light illustrated in FIG. 9 may not be accurate.

In the case of forming the low beam light distribution pattern, first light L1 is emitted from the first light emitting optical system LE1. Specifically, the first light L1 is emitted from the first light sources 31a, 31b, and 31c. The first light L1 from the first light source 31b is incident on the light guide member 40 from the first incident surface 41b, and is emitted from the first emission region 43a toward the projection lens 35 positioned in front. The same applies to the first light L1 from the first light sources 31a and 31c. Most of the first light L1 emitted from the first emission region 43a passes above the beam shaper 50 and is directly incident on the projection lens 35. A part of the first light L1 emitted from the first emission region 43a is incident on an upper surface 110S2 of the main member 110 of the beam shaper 50. A region irradiated with the first light L1 in the upper surface 110S2 is in continuous contact with the front end of the main member 110, and in the present embodiment, the region is in contact with the entire front end 53e1 of the base portion 53 of the main member 110. Then, an upper surface of the base portion 53, which is a part of the upper surface 110S2 of the main member 110, reflects a part of the first light L1 toward the projection lens 35 in such a way that a cutoff line having a shape corresponding to the front end 53e1 is formed in the light distribution pattern formed by the first light L1 and the light distribution pattern becomes the low beam light distribution pattern. Then, the low beam light distribution pattern is formed by the reflected first light and the first light L1 directly incident on the projection lens 35 from the first emission region 43a. In this way, the low beam light distribution pattern is formed by the first light L1, and light having the low beam light distribution pattern is transmitted through the projection lens 35 and emitted from the vehicle headlight 1 via the front cover 12. As described above, the rear focal point of the projection lens 35 is positioned at the front end 53e1 or the vicinity thereof. Therefore, the low beam light distribution pattern projected forward from the vehicle is a light distribution pattern inverted by the projection lens 35.

Figure 10:
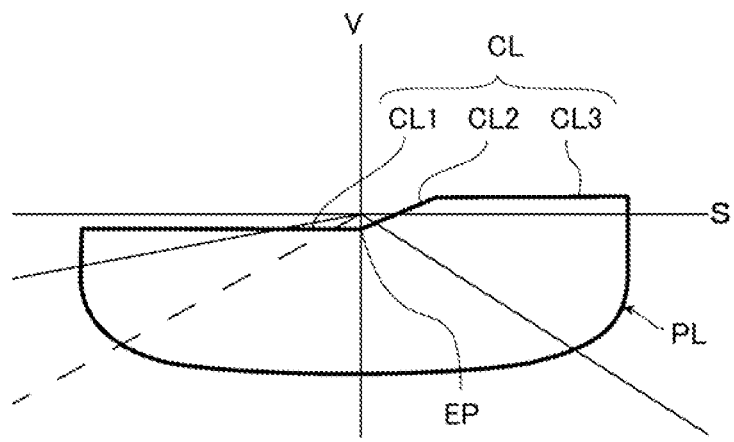
FIG. 10 is a view illustrating a low beam light distribution pattern according to the first embodiment.

FIG. 10 is a view illustrating the low beam light distribution pattern in the present embodiment. In FIG. 10, S indicates a horizontal line, V indicates a vertical line passing through the center of the vehicle in the left-right direction, and a low beam light distribution pattern PL projected on a virtual vertical screen arranged 25 m ahead of the vehicle is indicated by a thick line. The light guide member 40 and the beam shaper 50 have shapes such that the light distribution pattern of the first light L1 incident on the projection lens 35 becomes such a low beam light distribution pattern PL. The low beam light distribution pattern PL according to the present embodiment is applied in countries or areas where vehicles travel on the right side. Cutoff lines CL of the low beam light distribution pattern PL correspond to the shape of the front end 53e1 of the base portion 53, and includes a first line CL1, an inclined line CL2, and a second line CL3. The first line CL1 extends in the horizontal direction to the left side which is one side of an elbow point EP in the left-right direction, the elbow point EP being positioned below the horizontal line S and on or near the vertical line V. The inclined line CL2 extends obliquely upward from the elbow point EP to the right side, and a right end of the inclined line CL2 is positioned above the horizontal line S. The second line CL3 extends in the horizontal direction to the right side from the right end of the inclined line CL2.

Next, formation of the high beam light distribution pattern by the vehicle headlight 1 will be described.

In the case of forming the high beam light distribution pattern, the first light L1 is emitted from the first light emitting optical system LE1, and the second light L2 is emitted from the second light emitting optical system LE2. Specifically, the first light L1 is emitted from the first light sources 31a, 31b, and 31c, and the second light L2 is emitted from the second light source 32. Therefore, as described above, a low beam light distribution pattern PL is formed by the first light L1, and light having the low beam light distribution pattern PL is emitted from the vehicle headlight 1. As illustrated in FIG. 9, the second light L2 emitted from the second light source 32 is incident on the light guide member 40 from the second incident surface 42. The second light L2 incident on the light guide member 40 is emitted from the second emission region 43b toward the projection lens 35 positioned in front. Most of the second light L2 emitted from the second emission region 43b passes below the beam shaper 50 and is directly incident on the projection lens 35 disposed in front of the second emission region 43b. A part of the second light L2 emitted from the second emission region 43b is incident on a part of the lower surface 110S1 of the main member 110 exposed to the outside, a lower surface 120S1 of the reinforcing member 120, and a part of a side surface of the reinforcing member 120. The part of the lower surface 110S1 exposed to the outside is a part of a lower surface of the base portion 53, and the part reflects the part of the second light L2 toward the projection lens 35. A region irradiated with the second light L2 at the part of the lower surface 110S1 is in continuous contact with the front end of the main member 110, and in the present embodiment, the region is in contact with the entire front end 53e1 of the base portion 53 of the main member 110. Then, the part of the lower surface 110S1 reflects a part of the second light L2 toward the projection lens 35 in such a way that a cutoff line having a shape corresponding to the front end 53e1 is formed in the light distribution pattern formed by the second light L2 and the light distribution pattern becomes an additional light distribution pattern. Then, the additional light distribution pattern is formed by the reflected second light L2 and the second light L2 directly incident on the projection lens 35 from the second emission region 43b. The additional light distribution pattern is a light distribution pattern added to the low beam light distribution pattern PH to form the high beam light distribution pattern, and the second light L2 forming the additional light distribution pattern forms the high beam light distribution pattern with the first light L1. In this way, the additional light distribution pattern is formed by the second light L2, and light having the additional light distribution pattern is transmitted through the projection lens 35 and emitted from the vehicle headlight 1 via the front cover 12. Therefore, light having the high beam light distribution pattern is emitted from the vehicle headlight 1. The additional light distribution pattern projected forward from the vehicle is a light distribution pattern inverted by the projection lens 35 similarly to the low beam light distribution pattern PL. The cutoff line of the additional light distribution pattern is defined by the front end 53e1 of the base portion 53 similarly to the cutoff line CL of the low beam light distribution pattern PL. Therefore, the cutoff line of the additional light distribution pattern and the cutoff line CL of the low beam light distribution pattern PL substantially coincide with each other, and in the high beam light distribution pattern, the additional light distribution pattern and the low beam light distribution pattern PL are connected. In the present embodiment, the high beam light distribution pattern is formed by overlapping the first light L1 and the second light L2. However, the first light L1 and the second light L2 do not have to overlap each other. In this case, at least a part of the cutoff line of the additional light distribution pattern coincides with at least a part of the cutoff line CL of the low beam light distribution pattern PL, and the additional light distribution pattern and the low beam light distribution pattern PL are connected.

Figure 11:
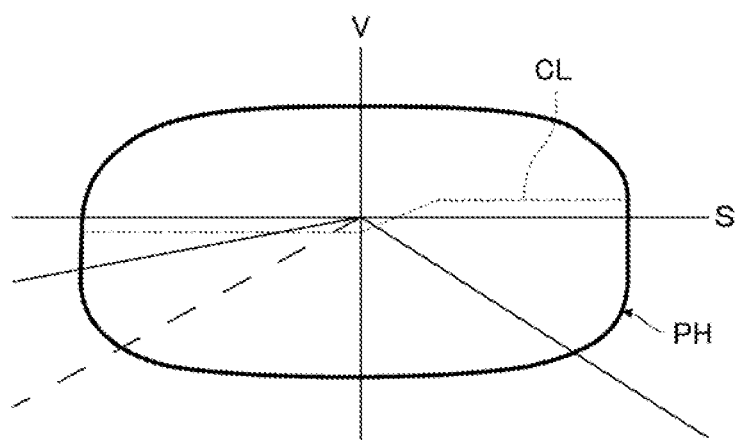
FIG. 11 is a view illustrating a high beam light distribution pattern according to the first embodiment.

FIG. 11 is a view illustrating the high beam light distribution pattern in the present embodiment, and is a view illustrating the high beam light distribution pattern similarly to FIG. 10. In FIG. 11, the cutoff line CL in the low beam light distribution pattern PL is indicated by a dotted line. A region below the cutoff line CL in the high beam light distribution pattern PH is formed by the first light L1, and a region above the cutoff line CL is formed by the second light L2.

Meanwhile, in the case of the vehicle headlight of Patent Literature 1 described above, a linear dark region extending in the left-right direction may be formed in the high beam light distribution pattern in a case where a distal end of the beam shaper is thick. For this reason, there is a demand for thinning the beam shaper. However, in a case where the beam shaper is thinned, a front end of the beam shaper is difficult to maintain a predetermined shape, and the cutoff line of the low beam may not have a predetermined shape.

Therefore, the vehicle headlight 1 according to the present embodiment includes the first light emitting optical system LE1, the second light emitting optical system LE2, the projection lens 35, and the plate-shaped beam shaper 50. The first light emitting optical system LE1 emits the first light L1 forming the low beam light distribution pattern PL forward. The second light emitting optical system LE2 emits the second light L2 forming the high beam light distribution pattern PH with the first light L1 forward. The second part of the second light emitting optical system LE2 that emits the second light L2 is positioned below the first part of the first light emitting optical system LE1 that emits the first light L1. The projection lens 35 is disposed in front of the first part and the second part, and transmits the first light L1 and the second light L2. The beam shaper 50 is disposed between the first and second parts and the projection lens 35. The beam shaper 50 includes the plate-shaped main member 110 and the plate-shaped reinforcing member 120 overlapping the main member 110.

In the vehicle headlight 1 according to the present embodiment, the main member 110 of the beam shaper 50 includes the base portion 53 having the part that includes the front end of the main member 110 and does not overlap the reinforcing member 120 and the part that overlaps the reinforcing member 120 and to which the reinforcing member 120 is fixed. Therefore, in the vehicle headlight 1 according to the present embodiment, the base portion 53 of the main member 110 can be suppressed from being easily deformed, and the front end 53e1 of the base portion 53 can maintain a predetermined shape even in a case where the main member 110 is thinned, unlike a case where the beam shaper 50 only includes the main member 110. Then, in the vehicle headlight 1 according to the present embodiment, the upper surface of the base portion 53 reflects a part of the first light L1 toward the projection lens 35 in such a way as to form the cutoff line CL of the low beam light distribution pattern PL. Therefore, with the vehicle headlight 1 according to the present embodiment, the cutoff line CL of the low beam light distribution pattern PL can be formed into a predetermined shape while suppressing formation of a linear dark region extending in the left-right direction in the high beam light distribution pattern PH unlike the above case. Therefore, with the vehicle headlight 1 according to the present embodiment, the low beam light distribution pattern PL and the high beam light distribution pattern PH can be more appropriately formed as compared with the above case.

The vehicle headlight 1 according to the present embodiment further includes the holder 80 that holds the beam shaper 50. The main member 110 further includes the fixing portions 52 that pinch the base portion 53 in the left-right direction and are connected to the left end and the right end of the base portion 53, respectively. The reinforcing member 120 includes the pair of left and right attachment portions 122 that overlap only the pair of fixing portions 52 and are fixed to the fixing portions 52, and the connecting portion 123 that extends from one attachment portion 122 to the other attachment portion 122, at least partially overlaps the base portion 53, and is fixed to the base portion 53. The fixing portions 52 and the attachment portions 122 are fixed to the holder 80. Therefore, in the vehicle headlight 1 according to the present embodiment, it is possible to suppress the first light L1 from being blocked by the holder 80. In addition, in the vehicle headlight 1 according to the present embodiment, both the left and right sides of the beam shaper 50 are held by the holder 80. Therefore, in the vehicle headlight 1 according to the present embodiment, the front end 53e1 of the base portion 53 of the main member 110 can maintain a predetermined shape even in a case where the main member 110 is thinned, unlike a case where only one of the left and right sides of the beam shaper 50 is held by the holder 80.

In the vehicle headlight 1 according to the present embodiment, the reinforcing member 120 is positioned under the main member 110. Therefore, it is possible to suppress formation of an unintended bright region or dark region in the low beam light distribution pattern PL due to reflection of the first light L1 on the side surface of the reinforcing member 120.

In the vehicle headlight 1 according to the present embodiment, the Young's modulus of the reinforcing member 120 is higher than the Young's modulus of the main member 110. Therefore, it is easier to make the base portion 53 less likely to be deformed without increasing the thickness of the main member 110 as compared with a case where the Young's modulus of the reinforcing member 120 is equal to or lower than the Young's modulus of the main member 110.

In the vehicle headlight 1 according to the present embodiment, the reinforcing member 120 has a thickness larger than that of the main member 110. Therefore, it is easy to make the base portion less likely to be deformed even in a case where the Young's modulus of the reinforcing member 120 and the Young's modulus of the main member 110 are the same.

In the vehicle headlight 1 according to the present embodiment, the base portion 53 includes the first base portion 56, the inclined portion 57, and the second base portion 58. The first base portion 56 extends in the horizontal direction, and the inclined portion 57 extends obliquely downward from the edge of the first base portion 56 on one side of the first base portion 56 in the left-right direction in the left-right direction toward the side opposite to the first base portion 56. In addition, the second base portion 58 extends in the horizontal direction from the edge of the inclined portion 57 on the side opposite to the first base portion 56 toward the side opposite to the inclined portion 57. Therefore, in the vehicle headlight 1 according to the present embodiment, the cutoff lines CL may include the first line CL1 extending in the horizontal direction from the elbow point EP to one side in the left-right direction, the inclined line CL2 extending obliquely upward from the elbow point EP to the other side in the left-right direction, and the second line CL3 extending in the horizontal direction from the end of the inclined line CL2 opposite to the elbow point EP as illustrated in FIG. 10.

Although the first aspect of the present invention has been described by taking the first embodiment as an example, the first aspect of the present invention is not limited thereto.

For example, in the first embodiment, the first light emitting optical system LE1 including the first light sources 31a, 31b, and 31c and the light guide member 40 and the second light emitting optical system LE2 including the second light source 32 and the light guide member 40 have been described as an example. However, the first light emitting optical system LE1 and the second light emitting optical system LE2 are not particularly limited. For example, the first light emitting optical system LE1 and the second light emitting optical system LE2 may include different light guide members without sharing the light guide member 40. Alternatively, the first light emitting optical system LE1 and the second light emitting optical system LE2 may each include a light source and a reflector that reflects light from the light source.

In the first embodiment, the beam shaper 50 that includes the main member 110 including the base portion 53 and the pair of fixing portions 52 and the reinforcing member 120 including the pair of attachment portions 122 and the connecting portion 123 has been described as an example. However, it is sufficient if the main member 110 includes the base portion 53 having the part that includes the front end of the main member 110 and does not overlap the reinforcing member 120 and the part that overlaps the reinforcing member 120 and to which the reinforcing member 120 is fixed. For example, the reinforcing member 120 does not have to include the attachment portion 122. However, the reinforcing member 120 preferably includes the pair of the attachment portions 122 and the connecting portion 123 from the viewpoint of making it easy for the front end 53e1 of the base portion 53 to maintain a predetermined shape. In addition, a configuration in which the holder 80 holds the beam shaper 50 is not particularly limited. For example, only one of the fixing portion 52 and the attachment portion 122 may be fixed to the holder 80. However, from the above viewpoint, the fixing portion 52 and the attachment portion 122 are preferably fixed to the holder 80.

In the above embodiment, the beam shaper 50 in which the gap GP1 is formed between the main member 110 and the reinforcing member 120 has been described as an example. However, the reinforcing member 120 may extend along the main member 110, and the gap GP1 does not have to be formed.

In the first embodiment, the reinforcing member 120 positioned under the main member 110 has been described as an example. However, the reinforcing member 120 may be positioned on the main member 110 and may be overlapped on the upper surface 110S2 of the main member 110 as illustrated in FIG. 12.

Figure 12:
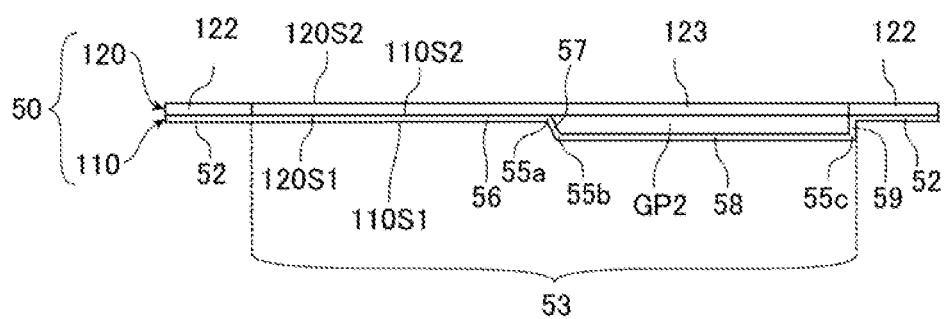
FIG. 12 is a front view schematically illustrating a beam shaper according to a first modification as the first aspect.

FIG. 12 is a front view schematically illustrating a beam shaper 50 according to a first modification as the first aspect, and is a front view of the beam shaper 50 as viewed from the front. The same or equivalent constituent elements as those of the first embodiment are denoted by the same reference numerals, and an overlapping description will be omitted unless otherwise specified.

As illustrated in FIG. 12, in the first modification, a position of a bent portion 55c of a base portion 53 is different from a position of a bent portion 55c in a fourth modification. In the present modification, the bent portion 55c is positioned on a left side of a bent portion 55b, and a left end of a second base portion 58 and a left fixing portion 52 are connected via a connecting portion 59 extending in the vertical direction. A right end of a first base portion 56 is connected to the left fixing portion 52. A pair of fixing portions 52 and the first base portion 56 are positioned on the same plane. Further, a reinforcing member 120 is positioned above a main member 110 and overlapped on an upper surface 110S2 of the main member 110. A gap GP2 is formed between the second base portion 58 and an inclined portion 57, and a connecting portion 123. Further, the connecting portion 123 is fixed to the first base portion 56 of the base portion 53. Also with such a beam shaper 50, it is possible to more appropriately form the low beam light distribution pattern PL and the high beam light distribution pattern PH as in the above-described embodiment, as compared with a case where the beam shaper 50 includes only the main member 110.

Figure 13:
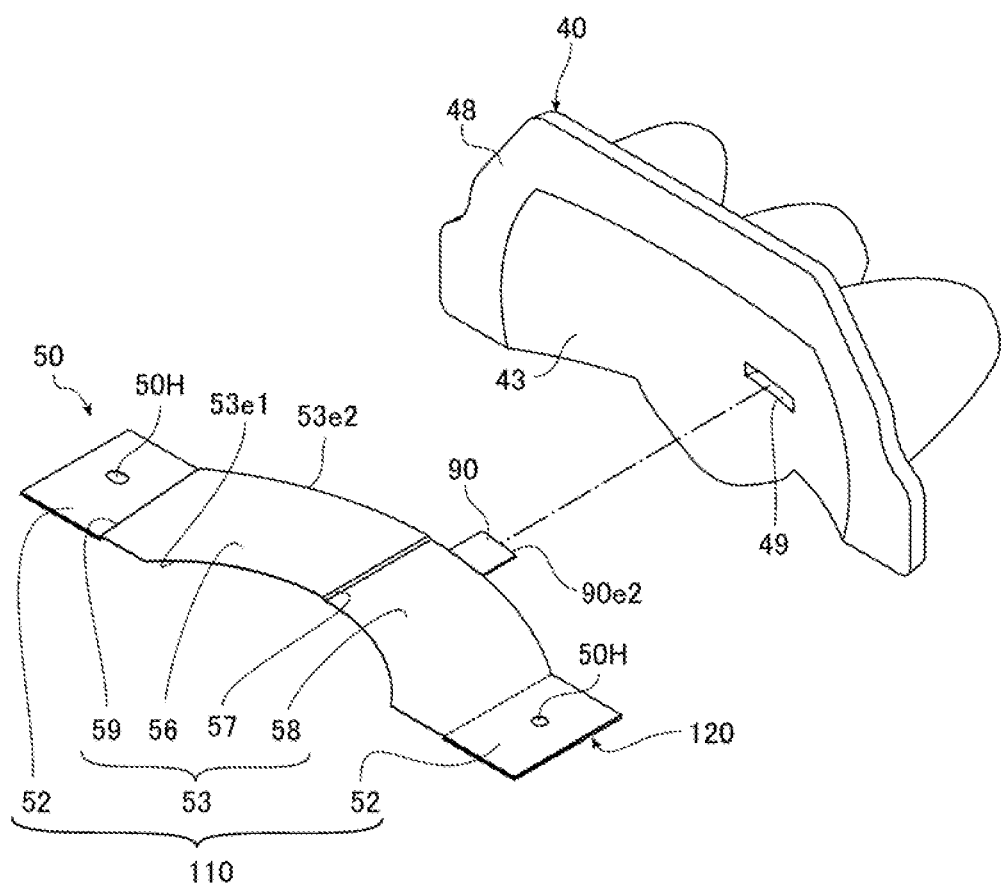
FIG. 13 is a perspective view schematically illustrating a beam shaper and a light guide member according to a second modification as the first aspect.
Figure 14:
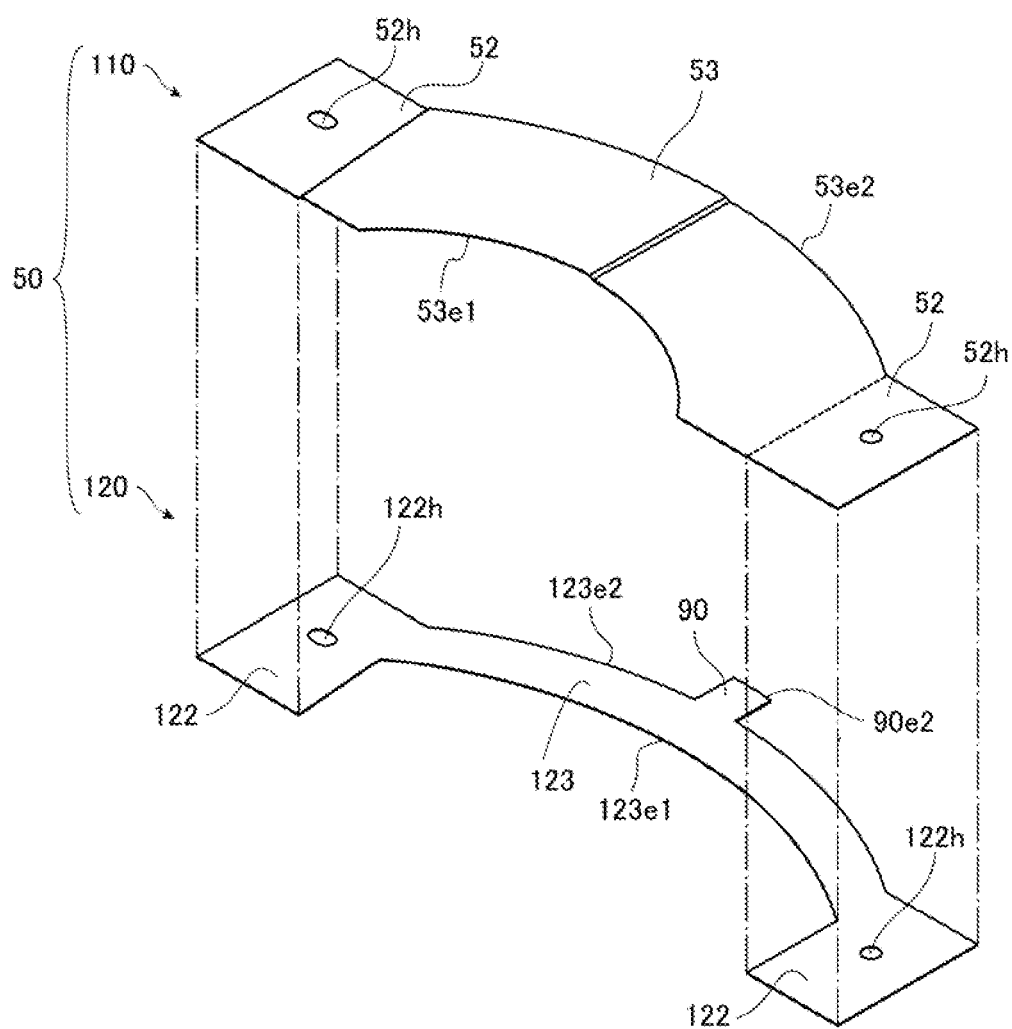
FIG. 14 is an exploded perspective view schematically illustrating the beam shaper according to the second modification as the first aspect.

The beam shaper 50 may be a beam shaper illustrated in FIGS. 13 and 14. FIG. 13 is a perspective view schematically illustrating a beam shaper 50 and a light guide member 40 according to a second modification as the first aspect, and is a perspective view of the beam shaper 50 and the light guide member 40 as viewed from the front and obliquely above. Further, FIG. 13 illustrates a state in which the beam shaper 50 is moved forward with respect to the light guide member 40. FIG. 14 is an exploded perspective view schematically illustrating the beam shaper 50 according to the second modification as the first aspect, and is an exploded perspective view of the beam shaper 50 as viewed from the front and obliquely above. The same or equivalent constituent elements as those of the above embodiment are denoted by the same reference numerals, and an overlapping description will be omitted unless otherwise specified.

Figure 15:
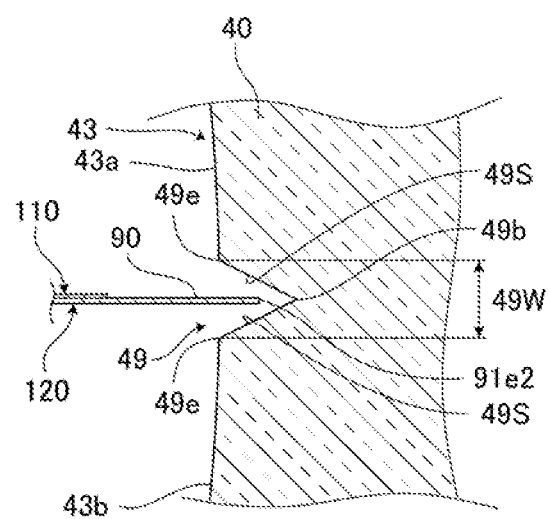
FIG. 15 is a cross-sectional view illustrating a state in which a position regulating portion is inserted into a recessed portion.

As illustrated in FIGS. 13 and 14, in the present modification, a reinforcing member 120 includes a position regulating portion 90 that is a plate-shaped member extending rearward from a rear end 123e2 of a connecting portion 123 in an extending direction of the connecting portion 123. A rear end 90e2 of the position regulating portion 90 is curved in an arc shape protruding rearward. In addition, the light guide member 40 includes a recessed portion 49 in an emission surface 43, and the position regulating portion 90 is inserted into the recessed portion 49 as illustrated in FIG. 15. As a result, it is possible to suppress misalignment in a relative position between the beam shaper 50 and the light guide member 40. Therefore, according to the present modification, the low beam light distribution pattern PL and the high beam light distribution pattern PH can be more appropriately formed as compared with a case where the beam shaper 50 does not include the position regulating portion 90.

The recessed portion 49 according to the present modification is a substantially V-shaped groove extending in the left-right direction along the rear end 90e2 of the position regulating portion 90. Therefore, the recessed portion 49 has a pair of surfaces 49S extending in a depth direction from an edge 49e of an opening of the recessed portion 49 and facing each other, and the pair of surfaces 49S are inclined in such a way as to approach each other toward a bottom 49b of the recessed portion 49. Therefore, it is possible to more easily insert the position regulating portion 90 into the recessed portion 49 while suppressing an increase in maximum amount of change in relative position between the beam shaper 50 and the light guide member 40 as compared with a case where the recessed portion does not have the pair of surfaces. The recessed portion 49 does not have to have a substantially V-shaped cross section, and may have, for example, a substantially U-shaped cross section. A depth of the recessed portion 49 is substantially constant in an extending direction of the recessed portion 49, and is, for example, about 1.0 mm to 3.0 mm. A width 49 W of the opening of the recessed portion 49 in a direction perpendicular to the extending direction of the recessed portion 49 is substantially constant in the extending direction of the recessed portion 49, and is, for example, about 1.0 mm to 3.0 mm.

In the present modification, the reinforcing member 120 includes the position regulating portion 90 that is the plate-shaped member. However, it is sufficient if at least one of the main member 110 or the reinforcing member 120 includes the position regulating portion 90 extending rearward from the rear end thereof, and the light guide member 40 having a first emission region 43a as a first part and a second emission region 43b as a second part includes the recessed portion 49 into which the position regulating portion 90 is inserted in a front side surface thereof. Therefore, the shape of the position regulating portion 90 and the shape of the recessed portion 49 are not particularly limited. For example, the position regulating portion 90 may be a pin extending rearward, and the recessed portion 49 may be a hole. In addition, the recessed portion 49 may be provided in a front side surface other than the emission surface 43.

In the first embodiment and the first and second modifications, the base portion 53 having the bent portions 55a, 55b, and 55c extending from the front end to the rear end of the base portion 53 has been described as an example. However, the bent portion only needs to extend from the front end of the base portion 53, and does not have to extend to the rear end of the base portion 53. The number of bent portions is not particularly limited. For example, the base portion 53 does not have to have the bent portion.

In the first embodiment and the first and second modifications, the holder 80 that holds the projection lens 35, the light guide member 40, and the beam shaper 50 has been described as an example. However, the holder 80 only needs to hold the beam shaper 50, and the projection lens 35 and the light guide member 40 may be held by a holder different from the holder 80. It is preferable that the holder 80 holds the light guide member 40 and the beam shaper 50 from the viewpoint of suppressing the misalignment in the relative position between the light guide member 40 and the beam shaper 50.

Second Embodiment

Next, a second embodiment as a second aspect of the present invention will be described. The same or equivalent constituent elements as those of the first embodiment are denoted by the same reference numerals and an overlapping description will be omitted unless otherwise specified.

Figure 16:
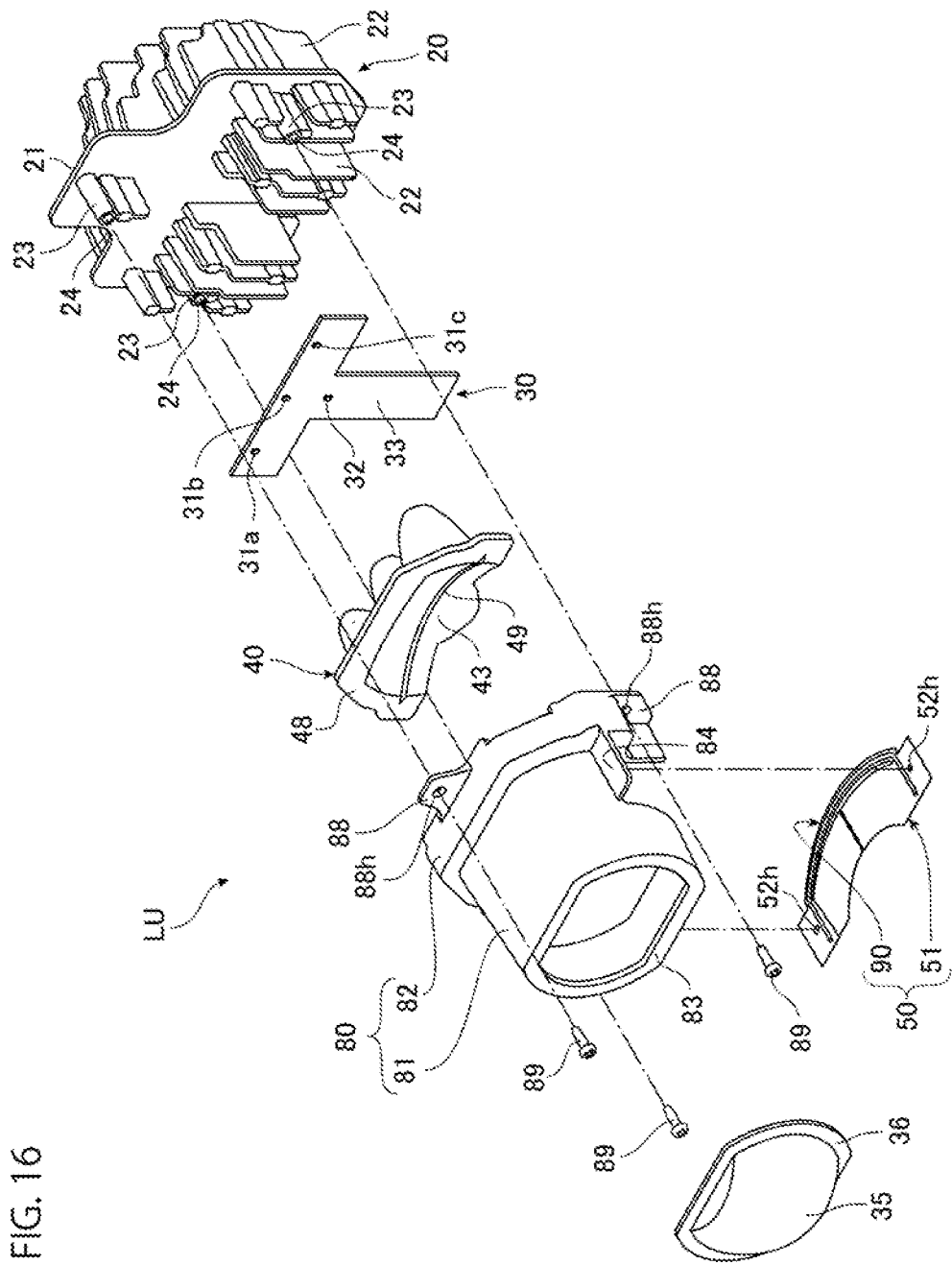
FIG. 16 is an exploded perspective view schematically illustrating a lamp unit according to a second embodiment as a second aspect.
Figure 17:
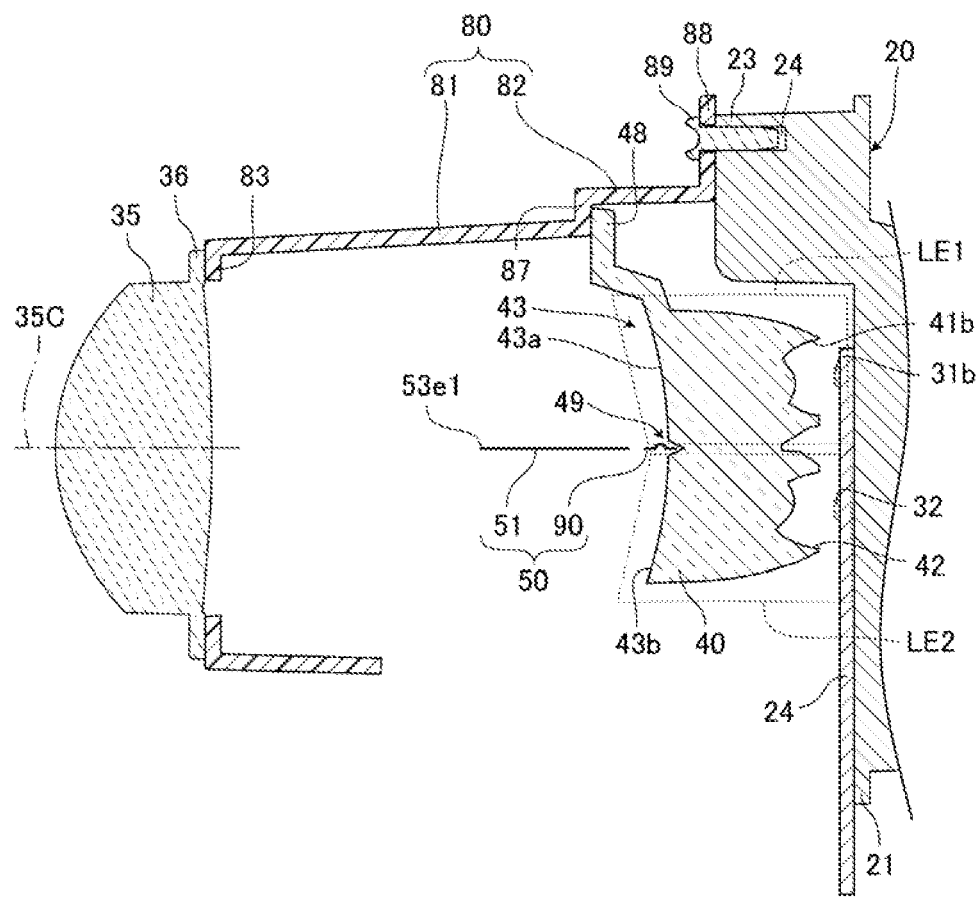
FIG. 17 is a vertical cross-sectional view of the lamp unit according to the second embodiment.

FIG. 16 is an exploded perspective view schematically illustrating a lamp unit LU in the present embodiment, and is an exploded perspective view of the lamp unit LU as viewed from the front and obliquely above. FIG. 17 is a vertical cross-sectional view of the lamp unit LU in the present embodiment. As illustrated in FIGS. 16 and 17, the lamp unit LU according to the present embodiment is different from the lamp unit LU according to the first embodiment mainly in that a recessed portion 49 is provided in an emission surface 43 of a light guide member 40, and a beam shaper 50 includes a plate-shaped main body portion 51 and a position regulating portion 90.

Figure 18:
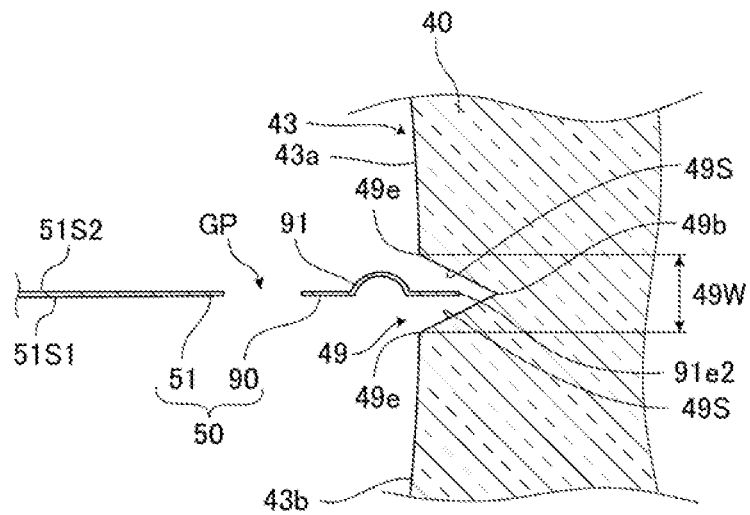
FIG. 18 is an enlarged view of the vicinity of a recessed portion in FIG. 17.

FIG. 18 is an enlarged view illustrating the vicinity of the recessed portion 49 in FIG. 17. As illustrated in FIGS. 16, 17, and 18, in the present embodiment, the recessed portion 49 is a substantially V-shaped groove extending in the left-right direction. Therefore, the recessed portion 49 has a pair of surfaces 49S extending in a depth direction from an edge 49e of an opening of the recessed portion 49 and facing each other, and the pair of surfaces 49S are inclined in such a way as to approach each other toward a bottom 49b of the recessed portion 49. The recessed portion 49 does not have to have a substantially V-shaped cross section, and may have, for example, a substantially U-shaped cross section. A depth of the recessed portion 49 is substantially constant in an extending direction of the recessed portion 49, and is, for example, about 1.0 mm to 3.0 mm. A width 49 W of the opening of the recessed portion 49 in a direction perpendicular to the extending direction of the recessed portion 49 is substantially constant in the extending direction of the recessed portion 49, and is, for example, about 1.0 mm to 3.0 mm. In addition, the recessed portion 49 crosses the emission surface 43.

As illustrated in FIG. 17, a region of the emission surface 43 above a rear end of the beam shaper 50 and above the recessed portion 49 is a first emission region 43a from which first light L1 is emitted. Further, a region of the emission surface 43 below the rear end of the beam shaper 50 and below the recessed portion 49 is a second emission region 43b from which second light L2 is emitted. The light guide member 40 guides the first light L1 and the second light L2 in this manner.

Figure 19:
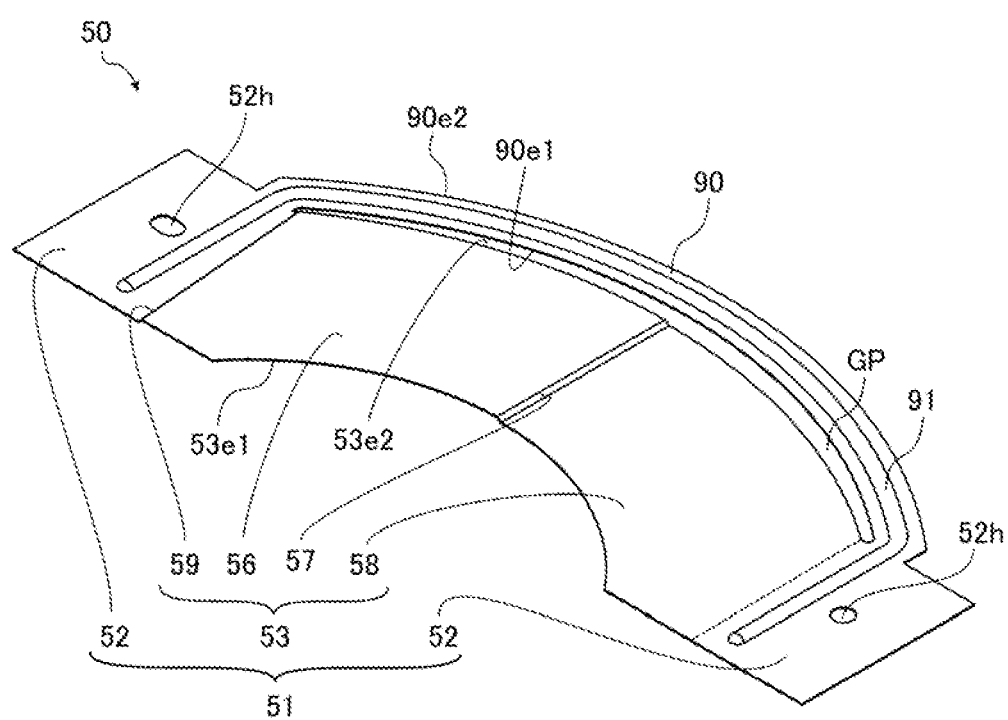
FIG. 19 is a perspective view schematically illustrating a beam shaper according to the second embodiment.
Figure 20:
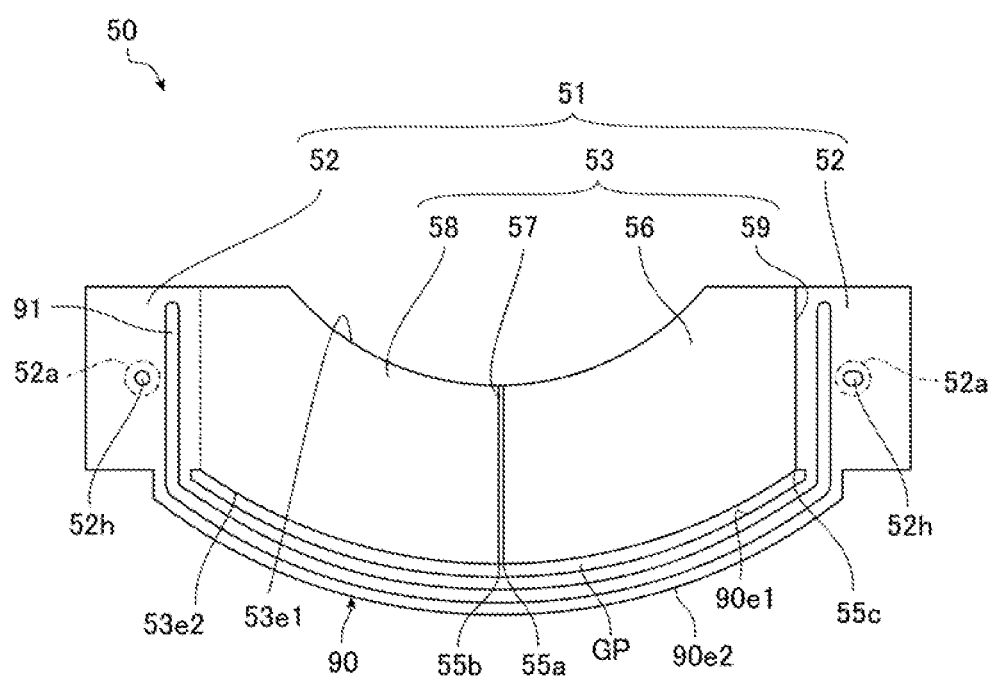
FIG. 20 is a plan view schematically illustrating the beam shaper according to the second embodiment.

FIG. 19 is a perspective view schematically illustrating the beam shaper 50 in the present embodiment, and is a perspective view of the beam shaper 50 as viewed from the front and obliquely above. FIG. 20 is a plan view schematically illustrating the beam shaper 50 in the present embodiment, and is a plan view of the beam shaper 50 as viewed from above. The upper side in FIG. 20 is a front side of the vehicle, and the lower side in FIG. 20 is a rear side of the vehicle. As illustrated in FIGS. 19 and 20, the beam shaper 50 includes the plate-shaped main body portion 51 and the position regulating portion 90. The main body portion 51 according to the present embodiment has the same configuration as the main member 110 according to the first embodiment. Therefore, a description of the configuration of the main body portion 51 is omitted.

The position regulating portion 90 is a member that extends rearward from the main body portion 51 and is inserted into the recessed portion 49 of the light guide member 40. The position regulating portion 90 according to the present embodiment is a plate-shaped member extending from a rear end of one fixing portion 52 to a rear end of the other fixing portion 52 through a rear side of a base portion 53. Therefore, a gap GP is formed between the position regulating portion 90 and the base portion 53. In the present embodiment, the position regulating portion 90 has a band shape extending along a rear end 53e2 of the base portion 53, and a front end 90e1 and a rear end 90e2 of the position regulating portion 90 are curved in an arc shape protruding rearward.

Such a beam shaper 50 has a protrusion 91 protruding upward. The protrusion 91 extends from one fixing portion 52 to the other fixing portion 52 through the position regulating portion 90. The protrusion 91 according to the present embodiment is a curved portion in which a part where the protrusion 91 is formed is curved in an arc shape. The protrusion 91 on the fixing portion 52 extends substantially linearly in the front-rear direction, and the protrusion 91 on the position regulating portion 90 extends in an arc shape along the center of the band-shaped position regulating portion 90 in a width direction. A height of the protrusion 91 is smaller than the width 49 W of the recessed portion 49 of the light guide member 40, and is, for example, 0.3 mm to 1.0 mm. In addition, parts of the position regulating portion 90 other than the protrusion 91 are positioned on the same plane as the pair of fixing portions 52. Therefore, a rear end portion of the position regulating portion 90 behind the protrusion 91 and the pair of fixing portions 52 are positioned on the same plane.

The beam shaper 50 according to the present embodiment is formed, for example, by performing plating on a base material formed by pressing a metal plate. Examples of metal of the metal plate include stainless steel and carbon steel. The beam shaper 50 may be formed by plating a member formed by cutting a member made of metal, or may include only a member formed by press working or cutting.

As illustrated in FIGS. 17 and 18, the beam shaper 50 is disposed between a projection lens 35 and the first and second emission regions 43a and 43b of the emission surface 43, the first emission region 43a being a part of the light guide member 40 from which the first light L1 is emitted, and the second emission region 43b being a part of the light guide member 40 from which the second light L2 is emitted. The rear end portion of the position regulating portion 90 is inserted into the recessed portion 49 of the light guide member 40. In the present embodiment, the main body portion 51 of the beam shaper 50 crosses the emission surface 43 when viewed from the front along an optical axis 35C of the projection lens 35. In addition, the optical axis 35C passes through a bent portion 55a of the base portion 53 of the main body portion 51 or the vicinity thereof, and a rear focal point of the projection lens 35 is positioned at a front end 53e1 of the base portion 53 or the vicinity thereof. The recessed portion 49 which is a groove extends along the rear end 90e2 of the position regulating portion 90, and the entire rear end 90e2 of the position regulating portion 90 is inserted into the recessed portion 49. As illustrated in FIG. 18, the protrusion 91 of the position regulating portion 90 is not positioned in the recessed portion 49.

The beam shaper 50 according to the present embodiment is fixed to a support portion 81 of a holder 80 as in the first embodiment. In the present embodiment, each of the pair of left and right fixing portions 52 of the main body portion 51 of the beam shaper 50 is in contact with a distal end of a pedestal portion 85 from below and is fixed to the pedestal portion 85. A height of the pedestal portion 85 is larger than a height of the protrusion 91 of the beam shaper 50, and the protrusion 91 is not in contact with a lower surface of a support plate 84 in a state in which the fixing portions 52 are fixed to the pedestal portion 85. In the present embodiment, the fixing portion 52 is fixed to the pedestal portion 85 by thermal caulking. Specifically, a head portion 86 that closes an opening of a through-hole 52h on a side opposite to the pedestal portion 85 is formed by melting a distal end portion of a pin protruding downward from the pedestal portion 85 and penetrating through the through-hole 52h of the fixing portion 52 by heat. In this way, the fixing portion 52 is sandwiched by the pedestal portion 85 and the head portion 86, and the fixing portion 52 is fixed to the pedestal portion 85. In FIG. 20, a part 52a of each fixing portion 52 that is in contact with the pedestal portion 85 and is fixed to the pedestal portion 85 is indicated by a line with alternating long and short dashes. In each fixing portion 52, the part 52a and the protrusion 91 overlap each other in the left-right direction. A method of fixing the fixing portion 52 is not particularly limited, and the fixing portion 52 may be fixed by ultrasonic fusion splicing or laser welding, for example.

Figure 21:
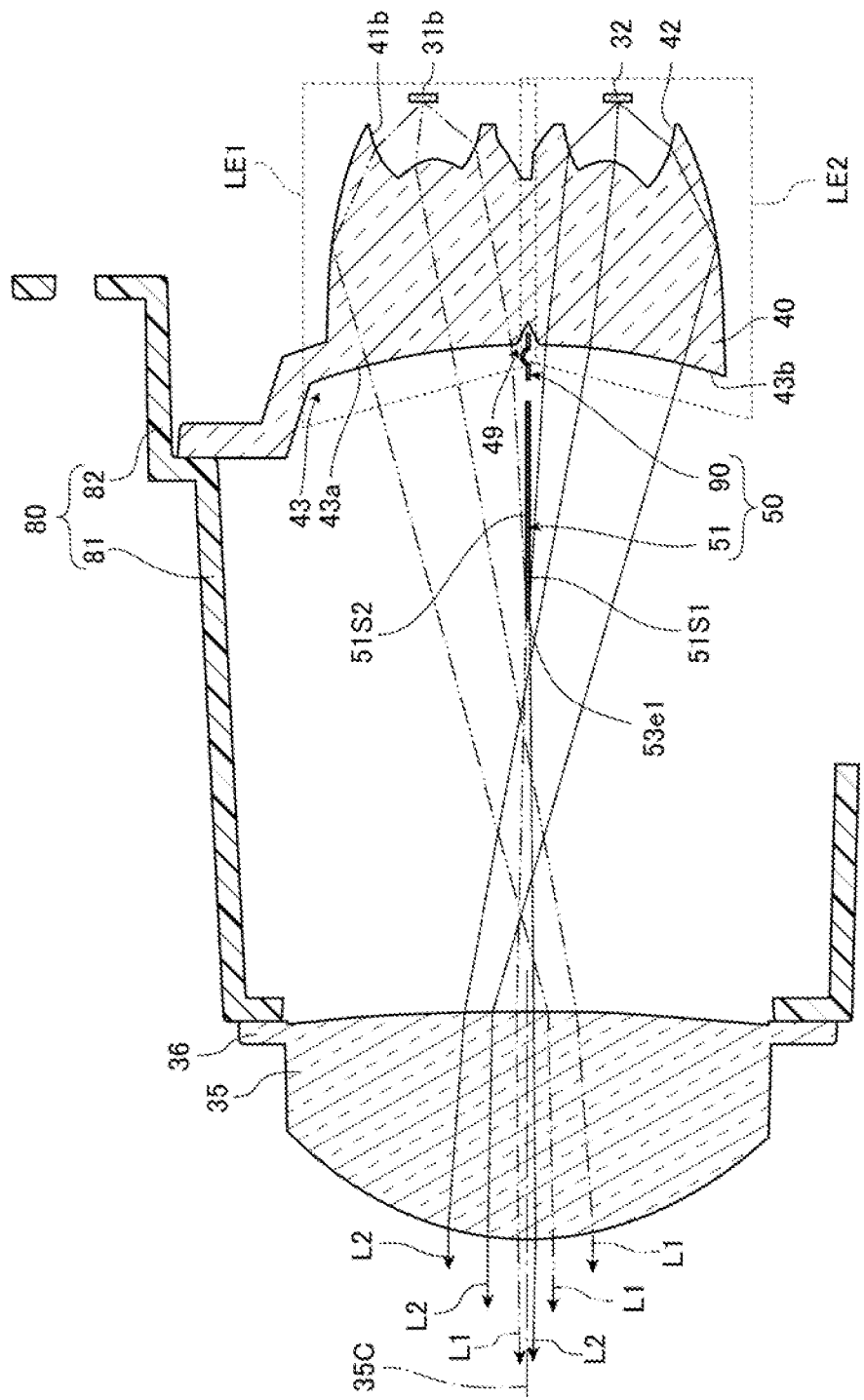
FIG. 21 is an enlarged view of a part of FIG. 17, schematically illustrating an optical path example of first light emitted from a first light source and second light emitted from a second light source.

Next, formation of a low beam light distribution pattern by a vehicle headlight 1 according to the present embodiment will be described. FIG. 21 is an enlarged view of a part of FIG. 17, schematically illustrating an optical path example of the first light emitted from a first light source and the second light emitted from a second light source. A reflection angle, a refraction angle, and the like of light illustrated in FIG. 21 may not be accurate.

In the case of forming the low beam light distribution pattern, the first light L1 is emitted from first light sources 31a, 31b, and 31c similarly to the first embodiment. The first light L1 from the first light source 31b is incident on the light guide member 40 from the first incident surface 41b, and is emitted from the first emission region 43a toward the projection lens 35 positioned in front. The same applies to the first light L1 from the first light sources 31a and 31c. Most of the first light L1 emitted from the first emission region 43a passes above the beam shaper 50 and is directly incident on the projection lens 35. A part of the first light L1 emitted from the first emission region 43a is incident on an upper surface 51S2 of the main body portion 51 of the beam shaper 50. A region irradiated with the first light L1 in the upper surface 51S2 is in continuous contact with a front end of the main body portion 51, and in the present embodiment, the region is in contact with the entire front end 53e1 of the base portion 53 of the main body portion 51. Then, an upper surface of the base portion 53, which is a part of the upper surface 51S2, reflects a part of the first light L1 toward the projection lens 35 in such a way that a cutoff line having a shape corresponding to the front end 53e1 is formed in the light distribution pattern formed by the first light L1 and the light distribution pattern becomes the low beam light distribution pattern. Then, the low beam light distribution pattern is formed by the reflected first light and the first light L1 directly incident on the projection lens 35 from the first emission region 43a. In this way, the low beam light distribution pattern is formed by the first light L1, and light having the low beam light distribution pattern is transmitted through the projection lens 35 and emitted from the vehicle headlight 1 via the front cover 12. The low beam light distribution pattern according to the present embodiment is the same as the low beam light distribution pattern PL illustrated in FIG. 10, and the shape of the light guide member 40, the shape of the beam shaper 50, and the like are adjusted in such a manner.

Next, formation of a high beam light distribution pattern by the vehicle headlight 1 according to the present embodiment will be described.

In the case of forming the high beam light distribution pattern, the first light L1 is emitted from the first light sources 31a, 31b, and 31c, and the second light L2 is emitted from a second light source 32, similarly to the first embodiment. Therefore, as described above, a low beam light distribution pattern PL is formed by the first light L1, and light having the low beam light distribution pattern PL is emitted from the vehicle headlight 1. As illustrated in FIG. 21, the second light L2 emitted from the second light source 32 is incident on the light guide member 40 from a second incident surface 42. The second light L2 incident on the light guide member 40 is emitted from the second emission region 43b toward the projection lens 35 positioned in front. Most of the second light L2 emitted from the second emission region 43b passes below the beam shaper 50 and is directly incident on the projection lens 35 disposed in front of the second emission region 43b. A part of the second light L2 emitted from the second emission region 43b is incident on a lower surface 51S1 of the main body portion 51. The lower surface 51S1 reflects the part of the second light L2 toward the projection lens 35. A region irradiated with the second light L2 in the lower surface 51S1 is in continuous contact with the front end of the main body portion 51, and in the present embodiment, the region is in contact with the entire front end 53e1 of the base portion 53 of the main body portion 51. Then, the lower surface 51S1 reflects a part of the second light L2 toward the projection lens 35 in such a way that a cutoff line having a shape corresponding to the front end 53e1 is formed in the light distribution pattern formed by the second light L2 and the light distribution pattern becomes an additional light distribution pattern. Then, the additional light distribution pattern is formed by the reflected second light L2 and the second light L2 directly incident on the projection lens 35 from the second emission region 43b. Similarly to the first embodiment, light having the additional light distribution pattern is transmitted through the projection lens 35 and emitted from the vehicle headlight 1 via the front cover 12. Therefore, light having the high beam light distribution pattern is emitted from the vehicle headlight 1. The high beam light distribution pattern according to the present embodiment is the same as the high beam light distribution pattern PH illustrated in FIG. 11, and the shape of the light guide member 40, the shape of the beam shaper 50, and the like are adjusted in such a manner.

By the way, in the case of the vehicle headlight of Patent Literature 1 described above, when there is a misalignment in the relative position between the lens in each of the first light emitting optical system and the second light emitting optical system and the beam shaper, the position of the cutoff line in the low beam light distribution pattern may be shifted, or an unintended dark region may be formed in the high beam light distribution pattern.

Therefore, the vehicle headlight 1 according to the present embodiment includes the first light sources 31a, 31b, and 31c, the second light source 32, the projection lens 35, the light guide member 40, the beam shaper 50, and the holder 80. The first light sources 31a, 31b, and 31c emit the first light L1 forming the low beam light distribution pattern PL forward. The second light source 32 is disposed below the first light sources 31a, 31b, and 31c, and emits the second light L2 forming the high beam light distribution pattern with the first light L1 forward. The projection lens 35 is disposed in front of the first light sources 31a, 31b, and 31c and the second light source 32. The light guide member 40 is disposed between the projection lens 35 and the first light sources 31a, 31b, and 31c and the second light source 32, and the first light L1 and the second light L2 are incident on the light guide member 40. The light guide member 40 emits the first light L1 from the first emission region 43a of the emission surface 43 toward the projection lens 35, and emits the second light L2 from the second emission region 43b of the emission surface 43 toward the projection lens 35. The second emission region 43b is positioned below the first emission region 43a. The beam shaper 50 is disposed between the first and second emission regions 43a and 43b and the projection lens 35, and includes the plate-shaped main body portion 51 and the position regulating portion 90. The upper surface 51S2 of the main body portion 51 reflects a part of the first light L1 toward the projection lens 35 in such a way as to form a cutoff line CL of the low beam light distribution pattern PL. The position regulating portion 90 extends rearward from the main body portion 51. The light guide member 40 includes the recessed portion 49 where the position regulating portion 90 is inserted into the emission surface 43 which is the front side surface of the light guide member 40.

In the vehicle headlight 1 according to the present embodiment, the position regulating portion 90 of the beam shaper 50 is inserted into the recessed portion 49 of the light guide member 40. Therefore, in the vehicle headlight 1 according to the present embodiment, it is possible to suppress misalignment in the relative position between the beam shaper 50 and the light guide member 40 as compared with a case where the beam shaper 50 does not include the position regulating portion 90. Therefore, with the vehicle headlight 1 according to the present embodiment, the low beam light distribution pattern PL and the high beam light distribution pattern PH can be more appropriately formed as compared with the above case.

In addition, in the vehicle headlight 1 according to the present embodiment, the main body portion 51 includes the pair of left and right fixing portions 52 fixed to the holder 80 and the base portion 53 positioned between the pair of fixing portions 52 and having left and right ends connected to the fixing portions 52, respectively. The position regulating portion 90 is a plate-shaped member extending from the rear end of one fixing portion 52 to the rear end of the other fixing portion 52 through the rear side of the base portion 53. Therefore, the gap GP is formed between the base portion 53 and the position regulating portion 90. The base portion 53 has the bent portions 55a, 55b, and 55c. Therefore, in the vehicle headlight 1 according to the present embodiment, moldability of the beam shaper 50 in press working can be improved as compared with a case where the gap GP is not formed between the base portion 53 and the position regulating portion 90.

In addition, in the vehicle headlight 1 according to the present embodiment, the beam shaper 50 has the protrusion 91 protruding upward, and the protrusion 91 extends from one fixing portion 52 to the other fixing portion 52 through the position regulating portion 90. Therefore, in the vehicle headlight 1 according to the present embodiment, the rigidity of the beam shaper 50 can be increased as compared with a case where the beam shaper 50 does not have the protrusion 91. Alternatively, no protrusion is formed on the base portion 53. Therefore, in the vehicle headlight 1 according to the present embodiment, it is possible to suppress blocking of the first light and the second light by the protrusion 91, and to more appropriately form the low beam light distribution pattern PL and the high beam light distribution pattern PH as compared with a case where the protrusion 91 is formed on the base portion 53. The protrusion 91 may be formed on the base portion 53, and the protrusion 91 may protrude upward from the viewpoint of increasing the rigidity of the beam shaper 50. Further, the protrusion 91 according to the present embodiment is a curved portion in which a part where the protrusion 91 is formed is curved in an arc shape. The present invention is not limited to such a configuration. For example, the protrusion 91 may be a thick portion in which the thickness of the part where the protrusion 91 is formed is larger than those of other portions.

In addition, in the vehicle headlight 1 according to the present embodiment, in each of the pair of fixing portions 52, the part 52*a* of the fixing portion 52 fixed to the holder 80 and the protrusion 91 overlap each other in the left-right direction. Therefore, in the vehicle headlight 1 according to the present embodiment, the rigidity of the beam shaper 50 held by the holder 80 can be further increased as compared with a case where the part 52*a* and the protrusion 91 do not overlap each other in the left-right direction.

In the vehicle headlight 1 according to the present embodiment, the rear end portion of the position regulating portion 90 and the pair of fixing portions 52 are positioned on the same plane. Therefore, in the vehicle headlight 1 according to the present embodiment, it is possible to easily align the beam shaper 50 and the light guide member 40 as compared with a case where the rear end portion of the position regulating portion 90 is inclined with respect to the fixing portions 52.

In the vehicle headlight 1 according to the present embodiment, the recessed portion 49 is a groove extending along the rear end 90*e*2 of the position regulating portion 90, and the entire rear end 90*e*2 of the position regulating portion 90 is inserted into the recessed portion 49. Therefore, in the vehicle headlight 1 according to the present embodiment, the maximum amount of change in relative position between the beam shaper 50 and the light guide member 40 can be reduced as compared with a case where only a part of the rear end 90*e*2 of the position regulating portion 90 is inserted into the recessed portion 49.

In the vehicle headlight 1 according to the present embodiment, the recessed portion 49 is a substantially V-shaped groove, and has a pair of surfaces 49S extending in the depth direction from the edge 49*e* of the opening of the recessed portion 49 and facing each other. The pair of surfaces 49S are inclined in such a way as to approach each other toward the bottom 49*b* of the recessed portion 49. Therefore, in the vehicle headlight 1 according to the present embodiment, it is possible to more easily insert the position regulating portion into the recessed portion while suppressing an increase in maximum amount of change in relative position between the beam shaper 50 and the light guide member 40 as compared with a case where the recessed portion 49 does not have the pair of surfaces 49S. From this point of view, it is sufficient if the recessed portion 49 has the pair of surfaces 49S extending in the depth direction and facing each other, and the pair of surfaces 49S are inclined in such a way as to approach each other toward the bottom 49*b* of the recessed portion 49. Therefore, the pair of surfaces 49S do not have to be flat surfaces and do not have to be connected to the edge 49*e*, and the bottom 49*b* of the recessed portion 49 may be curved in an arc shape.

In the vehicle headlight 1 according to the present embodiment, the base portion 53 includes the first base portion 56, the inclined portion 57, and the second base portion 58. The first base portion 56 extends in the horizontal direction, and the inclined portion 57 extends obliquely downward from the edge of the first base portion 56 on one side of the first base portion 56 in the left-right direction in the left-right direction toward the side opposite to the first base portion 56. In addition, the second base portion 58 extends in the horizontal direction from the edge of the inclined portion 57 on the side opposite to the first base portion 56 toward the side opposite to the inclined portion 57. Therefore, in the vehicle headlight 1 according to the present embodiment, the cutoff lines CL may include the first line CL1 extending in the horizontal direction from the elbow point EP to one side in the left-right direction, the inclined line CL2 extending obliquely upward from the elbow point EP to the other side in the left-right direction, and the second line CL3 extending in the horizontal direction from the end of the inclined line CL2 opposite to the elbow point EP as illustrated in FIG. 10.

In the vehicle headlight 1 according to the present embodiment, the holder 80 holds the beam shaper 50 and the light guide member 40. Therefore, in the vehicle headlight 1 according to the present embodiment, it is possible to suppress misalignment in the relative position between the beam shaper 50 and the light guide member 40.

Although the second aspect of the present invention has been described by taking the second embodiment as an example, the second aspect of the present invention is not limited thereto.

For example, in the second embodiment, the position regulating portion 90 which is a plate-shaped member extending from the rear end of one fixing portion 52 to the rear end of the other fixing portion 52 through the rear side of the base portion 53 has been described as an example. However, the position regulating portion 90 may extend rearward from the main body portion 51. For example, the position regulating portion 90 may be a position regulating portion illustrated in FIGS. 22 and 23.

Figure 22:
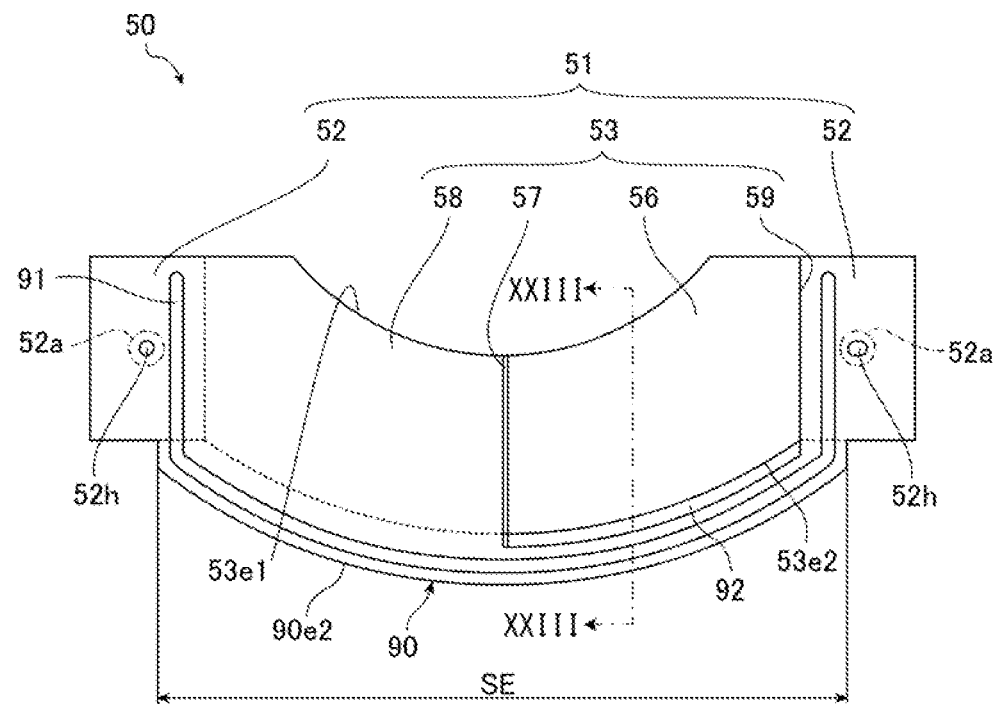
FIG. 22 is a plan view schematically illustrating a beam shaper according to a third modification as the second aspect.
Figure 23:
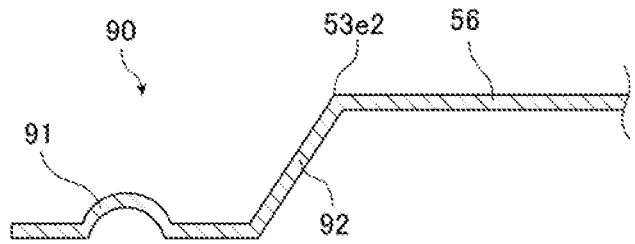
FIG. 23 is a cross-sectional view of the beam shaper taken along line XXIII-XXIII in FIG. 22.

FIG. 22 is a plan view schematically illustrating a beam shaper 50 according to a third modification as the second aspect, and FIG. 23 is a cross-sectional view of the beam shaper 50 taken along line XXIII-XXIII in FIG. 22. The same or equivalent constituent elements as those of the second embodiment are denoted by the same reference numerals, and an overlapping description will be omitted unless otherwise specified. As illustrated in FIGS. 22 and 23, the beam shaper 50 according to the third modification is different from the beam shaper 50 according to the second embodiment in that no gap GP is formed between a base portion 53 and a position regulating portion 90. In FIG. 22, a boundary between a main body portion 51 and the position regulating portion 90 and a boundary between the base portion 53 and a left fixing portion 52 of the main body portion 51 are indicated by dotted lines.

In the present modification, a front end of the position regulating portion 90 is continuously connected to a rear end of one fixing portion 52, a rear end of the base portion 53, and a rear end of the other fixing portion 52. Therefore, the position regulating portion 90 is a plate-shaped member extending rearward from a section SE of the rear end of the main body portion 51, the section SE continuing from the one fixing portion 52 to the other fixing portion 52. Therefore, in a vehicle headlight 1 according to the present modification, the rigidity of the beam shaper can be improved as compared with a case where a gap is formed between the base portion 53 and the position regulating portion 90. In the present modification, similarly to the above embodiment, a first base portion 56, an inclined portion 57, and a connecting portion 59 of the base portion 53 are not positioned on the same plane as the fixing portions 52. Therefore, the position regulating portion 90 includes an inclined portion 92 inclined with respect to a part of the position regulating portion 90 that is connected to the fixing portion 52.

Figure 24:
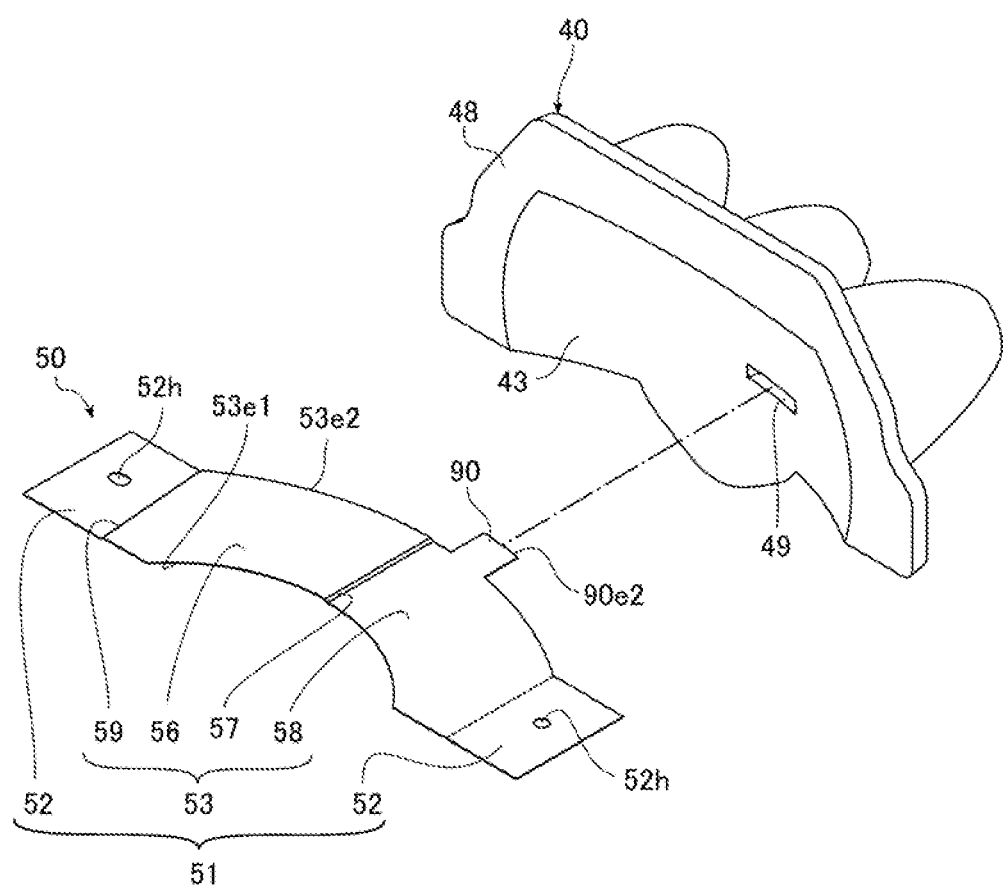
FIG. 24 is a perspective view schematically illustrating a beam shaper and a light guide member according to a fourth modification as the second aspect.

The position regulating portion 90 may be a position regulating portion illustrated in FIG. 24. FIG. 24 is a perspective view schematically illustrating a beam shaper 50 and a light guide member 40 according to the fourth modification as the second aspect, and is a perspective view of the beam shaper 50 and the light guide member 40 as viewed from the front and obliquely above. Further, FIG. 24 illustrates a state in which the beam shaper 50 is moved forward with respect to the light guide member 40. The same or equivalent constituent elements as those of the second embodiment are denoted by the same reference numerals, and an overlapping description will be omitted unless otherwise specified. As illustrated in FIG. 24, in the fourth modification, a position regulating portion 90 of the beam shaper 50 is different from the position regulating portion 90 according to the second embodiment. In addition, the light guide member 40 according to the present modification is different from the light guide member 40 according to the second embodiment in that a length of a recessed portion 49 in an extending direction is small.

The position regulating portion 90 according to the present modification is a plate-shaped member extending rearward in an extending direction of a second base portion 58 from a rear end of the second base portion 58 of a base portion 53. Similarly to the above embodiment, the position regulating portion 90 is inserted into the recessed portion 49 which is a groove provided in an emission surface 43 and extending in the left-right direction. Therefore, in the vehicle headlight 1 according to the present modification, the recessed portion 49 can be made smaller as compared with a case where the position regulating portion 90 is a plate-shaped member extending rearward from an entire rear end 53e2 of the base portion 53. Therefore, in the vehicle headlight 1 according to the present modification, as compared with this case, the emission surface 43 can be widened, and a range in which light can be emitted in a desired direction in the light guide member 40 can be widened. It is sufficient if the position regulating portion 90 is a plate-shaped member extending rearward from a part of the rear end 53e2 of the base portion 53 from the viewpoint of reducing the size of the recessed portion 49 as compared with a case where the position regulating portion 90 is a plate-shaped member extending rearward from the entire rear end 53e2 of the base portion 53. For example, the position regulating portion 90 do not have to extend in the extending direction of the second base portion 58, and may be a plate-shaped member extending rearward from a rear end of a first base portion 56. In addition, the beam shaper 50 may include a plurality of such position regulating portions, and for example, may include a plate-like position regulating portion extending from the rear end of the first base portion 56 and another plate-like position regulating portion extending from the rear end of the second base portion 58.

Figure 25:
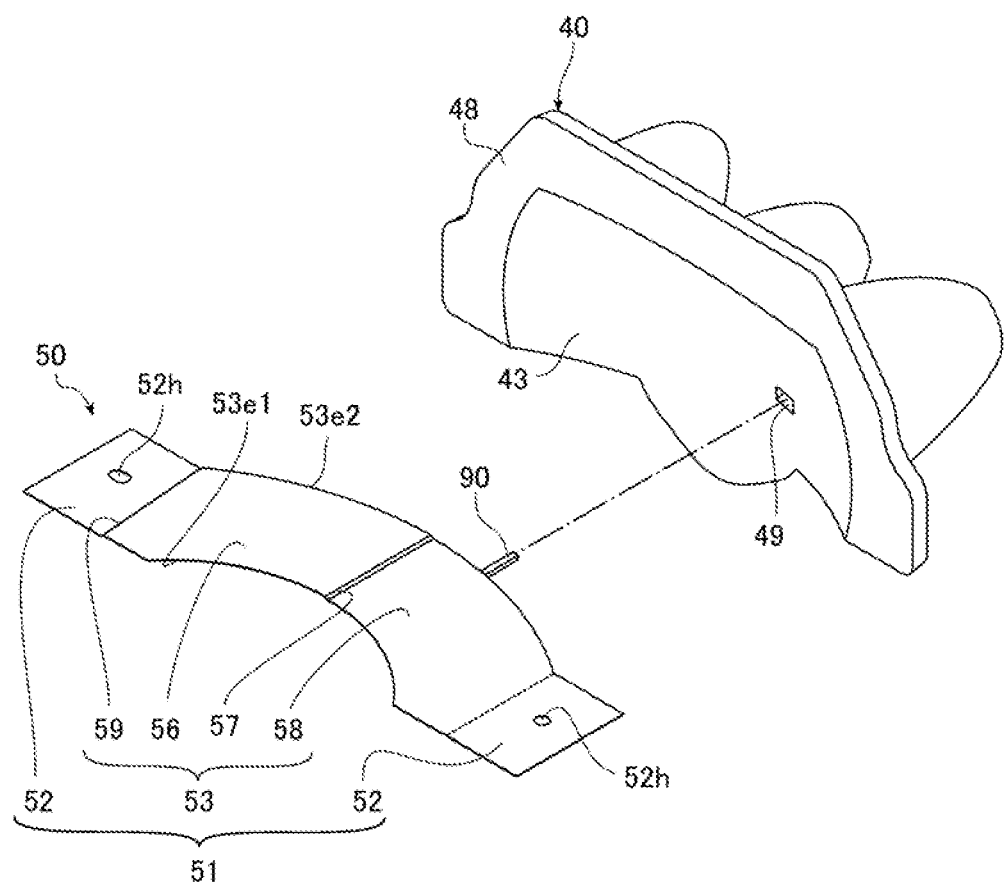
FIG. 25 is a view illustrating a beam shaper and a light guide member according to a fifth modification as the second aspect in the same manner as FIG. 24.

The position regulating portion 90 may be a position regulating portion illustrated in FIG. 25. FIG. 25 is a view illustrating a beam shaper 50 and a light guide member 40 according to a fifth modification as the second aspect similarly to FIG. 24. The same or equivalent constituent elements as those of the second embodiment are denoted by the same reference numerals, and an overlapping description will be omitted unless otherwise specified. As illustrated in FIG. 25, in the fifth modification, a position regulating portion 90 of the beam shaper 50 is different from the position regulating portion 90 according to the second embodiment, and a recessed portion 49 of the light guide member 40 is different from the recessed portion 49 according to the second embodiment.

The recessed portion 49 according to the present modification is a quadrangular hole provided in an emission surface 43. The position regulating portion 90 according to the present modification is a pin extending rearward from a main body portion 51. Specifically, the position regulating portion 90 according to the present modification is a quadrangular prism shaped pin fixed to a part of a second base portion 58 on a lower surface 51S1 of the main body portion 51 and extending rearward. Then, the position regulating portion 90 is inserted into the recessed portion 49 which is a quadrangular hole. A shape of the position regulating portion 90, which is a pin, is not particularly limited, and for example, the position regulating portion 90 may be a cylindrical pin. Further, the position regulating portion 90 may be thinned toward the rear, or may be fixed to the upper surface 51S2 of the main body portion 51. In addition, it is sufficient if the position regulating portion 90 can be inserted into the recessed portion 49 which is a hole, and the recessed portion 49 may be, for example, a circular hole, and a diameter of the hole may decrease toward a bottom thereof.

Furthermore, the beam shaper 50 and the light guide member 40 may be the beam shaper 50 and the light guide member 40 according to the second modification illustrated in FIGS. 13 to 15. That is, the main body portion 51 of the beam shaper 50 may include the main member 110 and the reinforcing member 120 according to the second modification, and the recessed portion 49 of the light guide member 40 may be the recessed portion 49 according to the second modification.

In addition, the beam shaper 50 may have a configuration in which the reinforcing member 120 of the beam shaper 50 according to the first modification illustrated in FIG. 12 includes the position regulating portion 90 as in the second modification. In this case, the recessed portion 49 of the light guide member 40 has the same configuration as the recessed portion 49 according to the second modification.

In the second embodiment and the second to fifth modifications, the light guide member 40 in which the recessed portion 49 is provided in the emission surface 43 has been described as an example. However, the light guide member 40 only needs to include the recessed portion 49 in the front side surface, and the recessed portion 49 may be provided in a surface other than the emission surface 43.

In the second embodiment and the second to fifth modifications, the base portion 53 having the bent portions 55a, 55b, and 55c extending from the front end to the rear end of the base portion 53 has been described as an example. However, the bent portion only needs to extend from the front end of the base portion 53, and does not have to extend to the rear end of the base portion 53. The number of bent portions is not particularly limited. For example, the base portion 53 does not have to have the bent portion.

In the second embodiment and the second to fifth modifications, the holder 80 that holds the projection lens 35, the light guide member 40, and the beam shaper 50 has been described as an example. However, the holder 80 only needs to hold the beam shaper 50, and the projection lens 35 and the light guide member 40 may be held by a holder different from the holder 80. It is preferable that the holder 80 holds the light guide member 40 and the beam shaper 50 from the viewpoint of suppressing the misalignment in the relative position between the light guide member 40 and the beam shaper 50.

According to the first aspect and the second aspect of the present invention, there is provided a vehicle headlight capable of appropriately forming a low beam light distribution pattern and a high beam light distribution pattern, and the vehicle headlight can be used in the field of headlights for vehicles such as automobiles.

The invention claimed is:

1. A vehicle headlight comprising:
a first light emitting optical system that emits first light forming a low beam light distribution pattern forward from a first part;
a second light emitting optical system that emits second light forming a high beam light distribution pattern with the first light forward from a second part positioned below the first part;
a projection lens that is disposed in front of the first part and the second part and transmits the first light and the second light;
a plate-shaped beam shaper that is disposed between the first and second parts and the projection lens,
a light transmissive light guide which is shared by the first light emitting optical system and the second light emitting optical system, and
a holder that holds the beam shaper, wherein
the beam shaper includes a plate-shaped main member and a plate-shaped reinforcing member overlapping the main member,
the main member includes a base portion having a part that includes a front end of the main member and does not overlap the reinforcing member and a part that overlaps the reinforcing member and to which the reinforcing member is fixed,
an upper surface of the base portion reflects a part of the first light toward the projection lens in such a way as to form a cutoff line of the low beam light distribution pattern,
the light guide has an emission surface, which is concavely curved rearward and includes the first part and the second part,
the main member further includes a pair of fixing portions that pinch the base portion in a left-right direction and are connected to a left end and a right end of the base portion, respectively,
the reinforcing member includes a pair of left and right attachment portions that overlap only the pair of fixing portions and are fixed to the fixing portions, respectively, and a connecting portion that extends from the left attachment portion to the right attachment portion, at least partially overlaps the base portion, and is fixed to the base portion,
the fixing portions and the attachment portions are fixed to the holder, and
a front end of the connecting portion of the reinforcing member is positioned in front of a front end of the base portion of the main member, and a width of the connecting portion in a front-rear direction is constant in a left-right direction.

2. The vehicle headlight according to claim 1, wherein the reinforcing member is positioned under the main member.

3. The vehicle headlight according to claim 1, wherein the reinforcing member is positioned on the main member.

4. The vehicle headlight according to claim 1, wherein a Young's modulus of the reinforcing member is higher than a Young's modulus of the main member.

5. The vehicle headlight according to claim 1, wherein the reinforcing member has a thickness larger than a thickness of the main member.

6. The vehicle headlight according to claim 1, wherein
the first light emitting optical system and the second light emitting optical system share a light guide member having a first emission region as the first part and a second emission region as the second part on a front side surface of the light guide member,
at least one of the main member or the reinforcing member includes a position regulating portion extending rearward from a rear end of the main member or the reinforcing member, and
the light guide member includes a recessed portion into which the position regulating portion is inserted in the front side surface.

7. The vehicle headlight according to claim 1, wherein the base portion includes a first base portion extending in a horizontal direction, an inclined portion extending obliquely downward from an edge of the first base portion on one side of the first base portion in the left-right direction toward a side opposite to the first base portion, and a second base portion extending in the horizontal direction from an edge of the inclined portion on the side opposite to the first base portion toward a side opposite to the inclined portion.

8. A vehicle headlight comprising:
a first light source that emits first light forming a low beam light distribution pattern forward;
a second light source that is disposed below the first light source and emits second light forming a high beam light distribution pattern with the first light forward;
a projection lens that is disposed in front of the first light source and the second light source;
a light guide member that is disposed between the first and second light sources and the projection lens, receives the first light and the second light, emits the first light from a first part toward the projection lens, and emits the second light from a second part positioned below the first part toward the projection lens;
a beam shaper that is disposed between the first and second parts and the projection lens and includes a plate-shaped main body and a position regulating portion; and
a holder that holds the beam shaper, wherein
an upper surface of the main body portion reflects a part of the first light toward the projection lens in such a way as to form a cutoff line of the low beam light distribution pattern,
the position regulating portion extends rearward from the main body portion,
the light guide member includes a recessed portion into which the position regulating portion is inserted on a front side surface of the light guide member, and
the main body of the beam shaper is disposed in front of the light guide member.

9. The vehicle headlight according to claim 8, wherein
the main body portion includes a pair of left and right fixing portions fixed to the holder, and a base portion positioned between the pair of fixing portions and having left and right ends connected to the fixing portions, and
the position regulating portion is a plate-shaped member extending from a rear end of one fixing portion to a rear end of the other fixing portion through a rear side of the base portion.

10. The vehicle headlight according to claim 9, wherein
the beam shaper includes a protrusion protruding upward or downward,
the protrusion extends from one fixing portion to the other fixing portion through the position regulating portion, and
the protrusion is a curved portion formed by curving a part of each of the main body and the position regulating portion.

11. The vehicle headlight according to claim 10, wherein in each of the pair of fixing portions, a part of the fixing portion fixed to the holder and the protrusion overlap each other in a left-right direction.

12. The vehicle headlight according to claim 9, wherein a rear end portion of the position regulating portion and the pair of fixing portions are positioned on the same plane.

13. The vehicle headlight according to claim 9, wherein
the recessed portion is a groove extending along a rear end of the position regulating portion, and
the entire rear end of the position regulating portion is inserted into the recessed portion.

14. The vehicle headlight according to claim 9, wherein
the recessed portion is a groove extending along a rear end of the position regulating portion,
the recessed portion has a pair of surfaces extending from an edge of an opening of the recessed portion and facing each other, and
the pair of surfaces are inclined in such a way as to approach each other toward a bottom of the recessed portion.

15. The vehicle headlight according to claim 9, wherein the base portion includes a first base portion extending in a horizontal direction, an inclined portion extending obliquely downward from an edge of the first base portion on one side of the first base portion in a left-right direction toward a side opposite to the first base portion, and a second base portion extending in the horizontal direction from an edge of the inclined portion on the side opposite to the first base portion toward a side opposite to the inclined portion.

16. The vehicle headlight according to claim 8, wherein
the main body portion includes a pair of left and right fixing portions fixed to the holder, and a base portion positioned between the pair of fixing portions and having left and right ends connected to the fixing portions, and
the position regulating portion is a plate-shaped member extending rearward from a section of a rear end of the main body portion, the section continuing from one fixing portion to the other fixing portion.

17. The vehicle headlight according to claim 8, wherein
the main body portion includes a pair of left and right fixing portions fixed to the holder, and a base portion positioned between the pair of fixing portions and having left and right ends connected to the fixing portions, and
the position regulating portion is a plate-shaped member extending rearward from a part of a rear end of the base portion.

18. The vehicle headlight according to claim 8, wherein
the main body portion includes a pair of left and right fixing portions fixed to the holder, and a base portion positioned between the pair of fixing portions and having left and right ends connected to the fixing portions, and
the position regulating portion is a pin extending rearward from the base portion.

19. The vehicle headlight according to claim 8, wherein
the main body portion includes a plate-shaped main member and a plate-shaped reinforcing member overlapping each other,
the main member includes a base portion having a part that includes a front end of the main member and does not overlap the reinforcing member and a part that overlaps the reinforcing member and to which the reinforcing member is fixed, and
an upper surface of the base portion reflects a part of the first light toward the projection lens in such a way as to form the cutoff line of the low beam light distribution pattern.

20. A vehicle headlight comprising:
a first light source that emits first light forming a low beam light distribution pattern forward;
a second light source that is disposed below the first light source and emits second light forming a high beam light distribution pattern with the first light forward;
a projection lens that is disposed in front of the first light source and the second light source;
a light guide member that is disposed between the first and second light sources and the projection lens, receives the first light and the second light, emits the first light from a first part toward the projection lens, and emits the second light from a second part positioned below the first part toward the projection lens;
a beam shaper that is disposed between the first and second parts and the projection lens and includes a plate-shaped main body and a position regulating portion; and
a holder that holds the beam shaper, wherein
an upper surface of the main body portion reflects a part of the first light toward the projection lens in such a way as to form a cutoff line of the low beam light distribution pattern,
the position regulating portion extends rearward from the main body portion,
the light guide member includes a recessed portion into which the position regulating portion is inserted on a front side surface of the light guide member,
the main body portion includes a pair of left and right fixing portions fixed to the holder, and a base portion positioned between the pair of fixing portions and having left and right ends connected to the fixing portions,
the position regulating portion is a plate-shaped member extending from a rear end of one fixing portion to a rear end of the other fixing portion through a rear side of the base portion, and
the base portion includes a first base portion extending in a horizontal direction, an inclined portion extending obliquely downward from an edge of the first base portion on one side of the first base portion in a left-right direction toward a side opposite to the first base portion, and a second base portion extending in the horizontal direction from an edge of the inclined portion on the side opposite to the first base portion toward a side opposite to the inclined portion.

21. A vehicle headlight comprising:
a first light source that emits first light forming a low beam light distribution pattern forward;
a second light source that is disposed below the first light source and emits second light forming a high beam light distribution pattern with the first light forward;
a projection lens that is disposed in front of the first light source and the second light source;
a light guide member that is disposed between the first and second light sources and the projection lens, receives the first light and the second light, emits the first light from a first part toward the projection lens, and emits the second light from a second part positioned below the first part toward the projection lens;
a beam shaper that is disposed between the first and second parts and the projection lens and includes a plate-shaped main body and a position regulating portion; and
a holder that holds the beam shaper, wherein
an upper surface of the main body portion reflects a part of the first light toward the projection lens in such a way as to form a cutoff line of the low beam light distribution pattern,
the position regulating portion extends rearward from the main body portion,
the light guide member includes a recessed portion into which the position regulating portion is inserted on a front side surface of the light guide member,
the main body portion includes a plate-shaped main member and a plate-shaped reinforcing member overlapping each other,
the main member includes a base portion having a part that includes a front end of the main member and does not overlap the reinforcing member and a part that overlaps the reinforcing member and to which the reinforcing member is fixed, and
an upper surface of the base portion reflects a part of the first light toward the projection lens in such a way as to form the cutoff line of the low beam light distribution pattern.

* * * * *